(12) United States Patent
Zhang et al.

(10) Patent No.: US 12,399,350 B2
(45) Date of Patent: Aug. 26, 2025

(54) LENS DESIGN FOR FULL-DUPLEX COMMUNICATION COMPRISING A LENS HAVING A FIRST CURVATURE CONFIGURED TO DISPERSE A REFLECTION OFF THE LENS AWAY FROM A RECEIVING ELEMENT

(71) Applicant: QUALCOMM Incorporated, San Diego, CA (US)

(72) Inventors: Danlu Zhang, San Diego, CA (US); Yehonatan Dallal, Kfar Saba (IL); Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 681 days.

(21) Appl. No.: 17/742,146

(22) Filed: May 11, 2022

(65) Prior Publication Data

US 2023/0367105 A1  Nov. 16, 2023

(51) Int. Cl.
*G02B 13/00* (2006.01)
*G02B 1/115* (2015.01)

(52) U.S. Cl.
CPC .......... *G02B 13/0055* (2013.01); *G02B 1/115* (2013.01)

(58) Field of Classification Search
CPC ... G02B 13/0055; H01Q 19/062; H01Q 15/08
See application file for complete search history.

(56) References Cited

U.S. PATENT DOCUMENTS

| 7,239,463 B2 | 7/2007 | Braun et al. | |
| 2005/0195505 A1* | 9/2005 | Braun | G02B 5/04 |
| | | | 359/211.2 |
| 2015/0080039 A1* | 3/2015 | Ling | H04B 7/24 |
| | | | 455/500 |
| 2018/0183152 A1 | 6/2018 | Turpin et al. | |
| 2022/0029304 A1 | 1/2022 | Dallal et al. | |

FOREIGN PATENT DOCUMENTS

| CN | 112799228 A | * 5/2021 | ............ G02B 27/00 |
| JP | 2001503579 A | * 3/2001 | ........... G01S 13/931 |

OTHER PUBLICATIONS

International Search Report and Written Opinion—PCT/US2023/016112—ISA/EPO—Jul. 10, 2023.

* cited by examiner

*Primary Examiner* — Paul C Lee
(74) *Attorney, Agent, or Firm* — Holland & Hart LLP/Qualcomm

(57) ABSTRACT

This disclosure provides systems, methods and apparatus, including computer programs encoded on computer storage media, for lens design for full-duplex communication. In some aspects, a device may use a lens design that enables full-duplex operation through a lens by facilitating an avoidance or mitigation of self-interference during full-duplex operation. The lens may have a first, antenna-facing surface and a second, outward-facing surface and, to avoid or mitigate self-interference due to reflection off the lens, the first surface may have a first curvature associated with a relatively small radius. In such examples, the device may transmit wireless signaling from a transmitting element and a reflection off the lens may be dispersed or otherwise oriented away from a receiving element in accordance with a design of the first curvature. In some implementations, the lens may include an anti-reflective coating to further reduce reflection off the lens.

30 Claims, 12 Drawing Sheets

Top View

Side View

Top View

Side View

LENS DESIGN FOR FULL-DUPLEX COMMUNICATION COMPRISING A LENS HAVING A FIRST CURVATURE CONFIGURED TO DISPERSE A REFLECTION OFF THE LENS AWAY FROM A RECEIVING ELEMENT

TECHNICAL FIELD

This disclosure relates to wireless communications, including lens design for full-duplex communication.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more network entities or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communications at a device. The method may include transmitting, through a lens via a transmitting element of the device, first signaling, the lens including a first surface associated with a first curvature and receiving, through the lens via a receiving element of the device, second signaling, where the first curvature of the first surface enables simultaneous transmission by the transmitting element in a first direction of incident signaling at the lens and reception by the receiving element at a second direction of refracted signaling from the lens to the receiving element.

Another innovative aspect of the subject matter described in this disclosure can be implemented in an apparatus for wireless communications at a device. The apparatus may include an interface and a processing system. The interface may be configured to output, through a lens via a transmitting element of the device, first signaling, the lens including a first surface associated with a first curvature and obtain, through the lens via a receiving element of the device, second signaling, where the first curvature of the first surface enables simultaneous transmission by the transmitting element in a first direction of incident signaling at the lens and reception by the receiving element at a second direction of refracted signaling from the lens to the receiving element.

Another innovative aspect of the subject matter described in this disclosure can be implemented in an apparatus for wireless communications at a device. The apparatus may include a processor, memory coupled with the processor, and instructions stored in the memory. The instructions may be executable by the processor to cause the apparatus to transmit, through a lens via a transmitting element of the device, first signaling, the lens including a first surface associated with a first curvature and receive, through the lens via a receiving element of the device, second signaling, where the first curvature of the first surface enables simultaneous transmission by the transmitting element in a first direction of incident signaling at the lens and reception by the receiving element at a second direction of refracted signaling from the lens to the receiving element.

Another innovative aspect of the subject matter described in this disclosure can be implemented in another apparatus for wireless communications at a device. The apparatus may include means for transmitting, through a lens via a transmitting element of the device, first signaling, the lens including a first surface associated with a first curvature and means for receiving, through the lens via a receiving element of the device, second signaling, where the first curvature of the first surface enables simultaneous transmission by the transmitting element in a first direction of incident signaling at the lens and reception by the receiving element at a second direction of refracted signaling from the lens to the receiving element.

Another innovative aspect of the subject matter described in this disclosure can be implemented in a non-transitory computer-readable medium storing code for wireless communications at a device. The code may include instructions executable by a processor to transmit, through a lens via a transmitting element of the device, first signaling, the lens including a first surface associated with a first curvature and receive, through the lens via a receiving element of the device, second signaling, where the first curvature of the first surface enables simultaneous transmission by the transmitting element in a first direction of incident signaling at the lens and reception by the receiving element at a second direction of refracted signaling from the lens to the receiving element.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
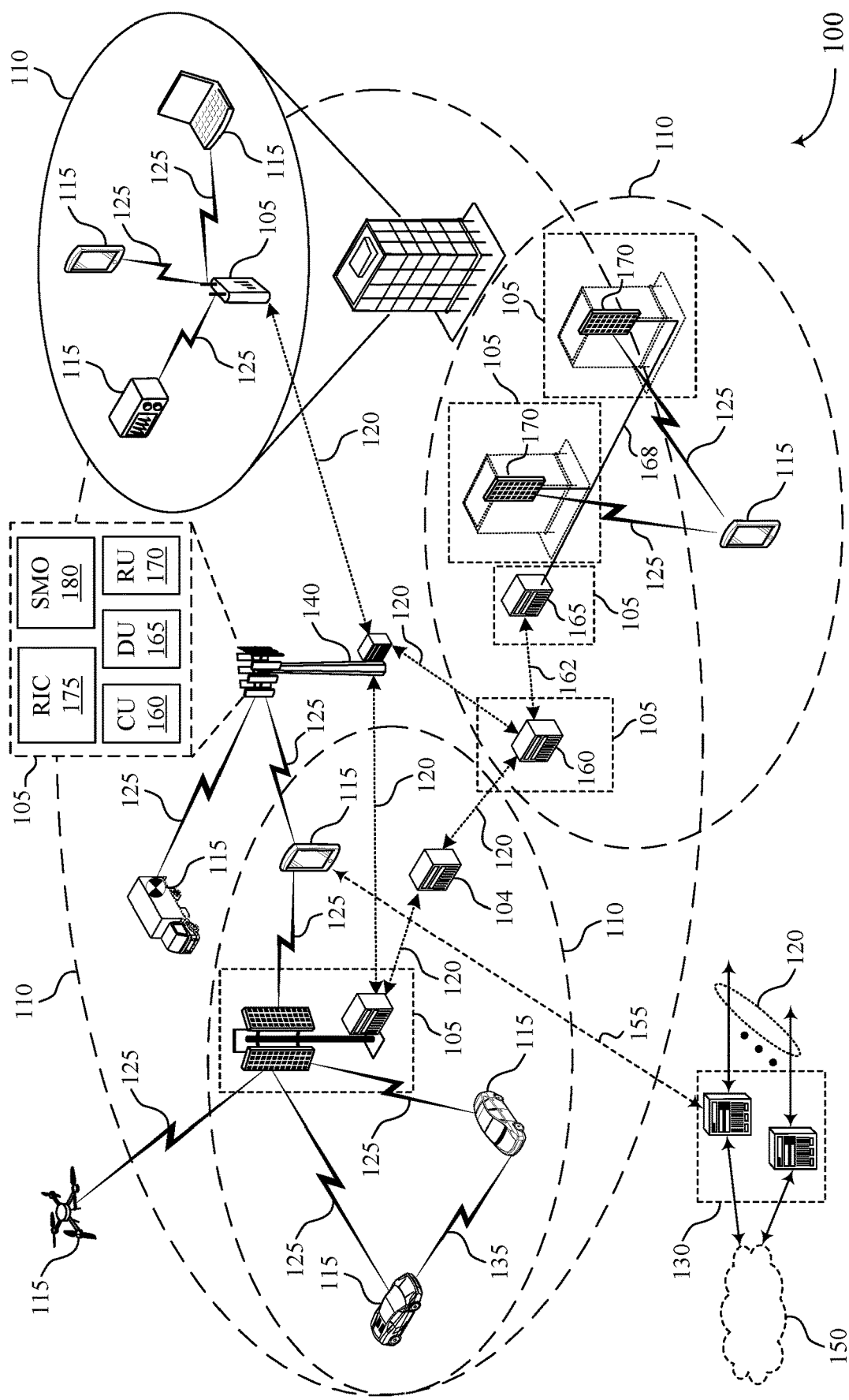
FIG. 1 shows an example wireless communications system that supports a lens design for full-duplex communication.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing third generation (3G), fourth generation (4G) or fifth generation (5G), or further implementations thereof, technology.

In some wireless communications systems, a device, which may be an example of a user equipment (UE) or a network entity may operate a transceiver unit capable of supporting multiple-input multiple-output (MIMO) configurations. In some deployment scenarios, such as scenarios associated with line-of-sight (LOS) conditions between two communicating devices, MIMO may be difficult to achieve as there may not be multiple transmission or reception channels. As such, a device may use a lens together with individual transmitting and receiving elements to effectively obtain a high rank channel (such as a high capacity, high gain, or otherwise high quality channel), even in LOS conditions, due to a relatively higher spatial resolution achieved by a lens (such as a high gain lens). A device also may utilize such a relatively higher spatial resolution to support full-duplex operation. As part of full-duplex operation, a device may transmit wireless signaling via one or more transmitting elements and receive wireless signaling via one or more receiving elements at the same time. A device using a lens together with individual transmitting and receiving elements and operating in accordance with full-duplex may experience self-interference, as wireless signaling from a transmitting element may reflect off the lens and create interference at a receiving element.

In some implementations of the present disclosure, a device may use a lens design that enables full-duplex operation through a lens in accordance with facilitating an avoidance or mitigation of self-interference arising from reflections off the lens. For example, a lens may have a first, antenna-facing surface and a second, outward-facing surface and, to avoid or mitigate self-interference arising from reflections off the first surface, the first surface may have a first curvature associated with a relatively small radius. In such examples, the device may transmit wireless signaling from a transmitting element and, in accordance with the first curvature of the first surface, a reflection off the lens may be dispersed or otherwise oriented away from a receiving element. Additionally, or alternatively, the lens may include an anti-reflective coating to reduce reflection off the lens. In some implementations, a thickness of the anti-reflective coating may be associated with a placement of a transmitting element and a receiving element. For example, the thickness of the anti-reflective coating may be associated with an angle of incident signaling from a transmitting element that may result in a reflection toward a receiving element. The thickness of the anti-reflective coating also may depend on a wavelength at which the device may transmit or receive and, in some implementations, the lens may include multiple anti-reflective coatings, each anti-reflective coating associated with a different set of one or more wavelengths at which the device may transmit or receive.

Particular implementations of the subject matter described in this disclosure can be implemented to realize one or more of the following potential advantages. For example, in accordance with supporting a lens design associated with a surface or an anti-reflective coating, or both, that avoids or mitigates reflection-based self-interference at a receiving element from a transmitting element, a device communicating through the lens may operate in accordance with full-duplex while maintaining a high likelihood for successful communication. In accordance with avoiding or mitigating self-interference between the transmitting element and the receiving element and a higher likelihood for successful communication, the device may achieve higher data rates, greater capacity, and greater spectral efficiency. Further, in accordance with facilitating the possibility of full-duplex operation through a lens in a MIMO configuration, the device may have greater operational flexibility (such as flexible duplexing), which may support reduced hardware, software, or firmware complexity and lower power consumption at the device, among other benefits. Additionally, in some implementations, a lens having the described lens design may generally be manufactured without an excessive increase in cost. For example, the curvatures of the lens may follow spheres on both sides or the lens may be made through a 3D printing technique, both of which may facilitate low-cost manufacturing.

FIG. 1 shows an example wireless communications system 100 that supports a lens design for full-duplex communication. The wireless communications system 100 may include one or more network entities 105, one or more UEs 115, and a core network 130. In some implementations, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In some implementations, network entities 105 and UEs 115 may wirelessly communicate via one or more communication links 125. For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another over a backhaul communication link 120 (such as in accordance with an X2, Xn, or other interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 through a communication link 155.

One or more of the network entities 105 described herein may include or may be referred to as a base station (BS) 140 (such as a base transceiver station, a radio BS, an access point, a radio transceiver, a NodeB, an eNodeB (eNB), a next-generation NodeB or a giga-NodeB (either of which may be referred to as a gNB), a next-generation eNB (ng-eNB), a Home NodeB, a Home eNodeB, or other suitable terminology). A network entity 105 (such as a BS 140) may be implemented in an aggregated or monolithic BS architecture, or alternatively, in a disaggregated BS architecture. For example, a network entity 105 may include one or more of a central unit (CU) 160, a distributed unit (DU) 165, a radio unit (RU) 170, a Radio Access Network (RAN) Intelligent Controller (MC) 175 (such as a Near-Real Time RIC (Near-RT RIC), a Non-Real Time MC (Non-RT MC), a Service Management and Orchestration (SMO) 180 system, or any combination thereof. An RU 170 also may be referred to as a radio head, a smart radio head, a remote radio head (RRH), a remote radio unit (RRU), or a transmission/reception point (TRP). One or more components of the network entities 105 of a disaggregated RAN may be co-located, or one or more components of the network entities 105 may be located in distributed locations. A disaggregated RAN architecture may include or refer to an Open RAN (O-RAN) or Virtualized RAN (VRAN) architecture.

The split of functionality between a CU 160, a DU 165, and an RU 175 is flexible and may support different functionalities depending upon which functions (such as network layer functions, protocol layer functions, baseband functions, radio frequency functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication over such communication links.

In wireless communications systems (such as wireless communications system 100), infrastructure and spectral resources for radio access may support wireless backhaul link capabilities to supplement wired backhaul connections, providing an integrated access backhaul (IAB) network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 (such as one or more RUs 170) may be partially controlled by CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor. An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)). In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

For instance, an access network (AN) or RAN may include communications between access nodes (such as an IAB donor), IAB nodes 104, and one or more UEs 115. The IAB donor may facilitate connection between the core network 130 and the AN (such as via a wired or wireless connection to the core network 130). That is, an IAB donor may refer to a RAN node with a wired or wireless connection to core network 130. The IAB donor may include a CU 160 and at least one DU 165 (such as and RU 170), in which implementation the CU 160 may communicate with the core network 130 over an interface (such as a backhaul link). IAB donor and IAB nodes 104 may communicate over an F1 interface according to a protocol that defines signaling messages (such as an F1 AP protocol). Additionally, or alternatively, the CU 160 may communicate with the core network over an interface, which may be an example of a portion of backhaul link, and may communicate with other CUs 160 (such as a CU 160 associated with an alternative IAB donor) over an Xn-C interface, which may be an example of a portion of a backhaul link.

An IAB node 104 may refer to a RAN node that provides IAB functionality (such as access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (such as an IAB donor may relay transmissions for UEs through one or more other IAB nodes 104). Additionally, or alternatively, an IAB node 104 also may be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (such as DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (such as a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (such as transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the implementation of the techniques described herein applied in the context of a disaggregated RAN architecture, one or more components of the disaggregated RAN architecture may be configured to support lens design for full-duplex communication as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUs 170, RIC 170, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BSs, among other examples, as shown in FIG. 1.

The UEs 115 and the network entities 105 may wirelessly communicate with one another via one or more communication links 125 (such as an access link) over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (such as entity, sub-entity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (such as a duration of one modulation symbol) and one subcarrier, in which implementation the symbol period and subcarrier spacing may be inversely related. The quantity of bits carried by each resource element may depend on the modulation scheme (such as the order of the modulation scheme, the coding rate of the modulation scheme, or both) such that the more resource elements that a device receives and the higher the order of the modulation scheme, the higher the data rate may be for the device. A wireless communications resource may refer to a combination of a radio frequency spectrum resource, a time resource, and a spatial resource (such as a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a network entity 105 (such as a BS 140, an RU 170) may be movable and therefore provide communication coverage for a moving coverage area 110. In some implementations, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be able to communicate directly with other UEs 115 over a device-todevice (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by or scheduled by the network entity 105. In some implementations, one or more UEs 115 in such a group may be outside the coverage area 110 of a network entity 105 or may be otherwise unable to or not configured to receive transmissions from a network entity 105. In some implementations, groups of the UEs 115 communicating via D2D communications may support a one-to-many (1:M) system in which each UE 115 transmits to each of the other UEs 115 in the group. In some implementations, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BSs 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (such as from 30 GHz to 300 GHz), also known as the millimeter band. In some implementations, the wireless communications system 100 may support millimeter wave (mmW) communications between the UEs 115 and the network entities 105 (such as BSs 140, RUs 170), and EHF antennas of the respective devices may be smaller and more closely spaced than UHF antennas. In some implementations, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed radio frequency spectrum bands, devices such as the network entities 105 and the UEs 115 may employ carrier sensing for collision detection and avoidance. In some implementations, operations in unlicensed bands may be associated with a carrier aggregation configuration in conjunction with component carriers operating in a licensed band (such as LAA). Operations in unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (such as the same codeword) or different data streams (such as different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

In some wireless communications systems, such as the wireless communications system 100, a device, which may be an example of a UE 115 or a network entity 105 may operate a transceiver unit capable of supporting MIMO configurations. For example, the device may employ a massive MIMO or a distributed MIMO communication technique. A massive MIMO technique may be associated with a device (such as a UE 115 or a network entity 105) using arrays of multiple (such as 16 or more) physical antenna elements combined with spatial multiplexing and beamforming. A distributed MIMO technique, which may be equivalently referred to as a distributed massive MIMO technique, may similarly be associated with multiple antennas. In implementations of distributed MIMO, the multiple antennas may be logical (in addition to, or as an alternative to, physical) and may be geographically distributed over a cell. As such, a user may frequently be close to at least one antenna, which may provide greater capacity and quality of experience for the user across various environments (such as indoor environments).

In some deployment scenarios, a device may use a lens together with individual transmitting and receiving elements to effectively obtain a high rank channel (such as a high capacity, high gain, or otherwise high quality channel) and to achieve MIMO due to a relatively higher spatial resolution achieved by a lens (such as a high gain lens). A device also may utilize such a relatively higher spatial resolution to support full-duplex operation, but using a lens together with individual transmitting and receiving elements and in a full-duplex operation mode may increase a likelihood of self-interference, as wireless signaling from a transmitting element may reflect off the lens and create interference at a receiving element.

In some implementations, a device may use a lens design that facilitates avoidance or mitigation of self-interference during full-duplex operation through a lens. For example, a lens may have a first surface associated with a first curvature and, due to the design of the first surface of the lens, reflected signaling off the lens from a transmitting element may be oriented away from a receiving element, which may reduce self-interference at the receiving element.

Additionally, or alternatively, the lens may include or otherwise have an anti-reflective coating to reduce reflection off the lens. In some implementations, a thickness or depth of the anti-reflective coating may be associated with a placement of a transmitting element and a receiving element. For example, the thickness or depth of the anti-reflective coating may be associated with an angle of incident signaling from the transmitting element that may result in a reflection toward the receiving element (which may depend on the relative placement of the transmitting element and the receiving element). The thickness or depth may additionally, or alternatively, depend on a wavelength at which the device transmits or receives. In some implementations (such as implementations in which the device is capable of transmitting or receiving at multiple different radio frequencies associated with multiple different wavelengths), the lens may include or have multiple anti-reflective coatings, each anti-reflective coating associated with a different wavelength at which the device can transmit or receive. As such, the lens may disperse or dissipate reflections off the lens across various radio frequencies over which the device may transmit or receive, which may support full-duplex operation across such various radio frequencies.

Figure 2:
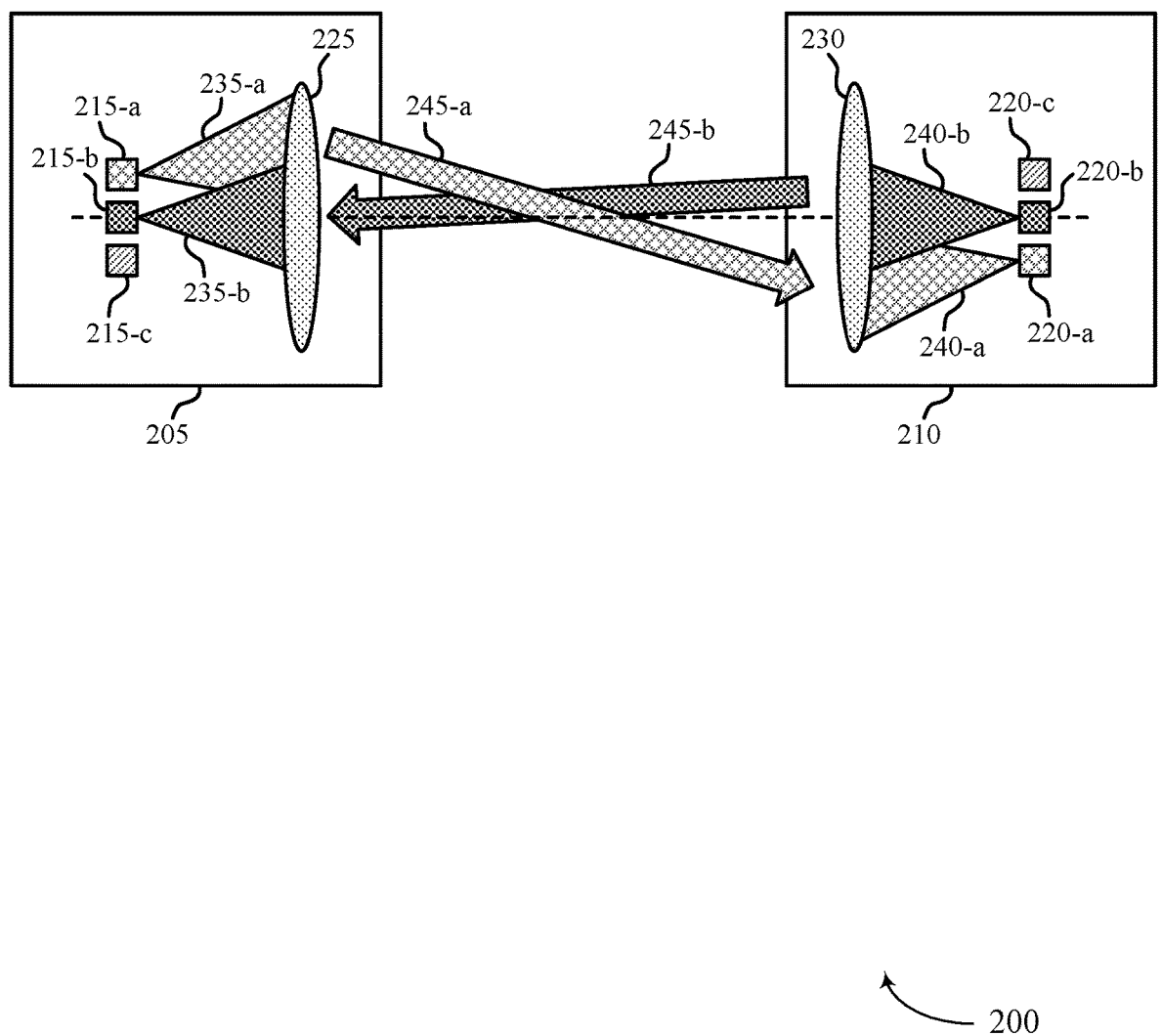
FIG. 2 shows an example signaling diagram that supports a lens design for full-duplex communication.

FIG. 2 shows an example signaling diagram 200 that supports a lens design for full-duplex communication. The signaling diagram 200 may implement or be implemented to realize aspects of the wireless communications system 100. For example, the signaling diagram 200 may illustrate communication between a device 205 and a device 210. The device 205 may be an example of a UE 115 or a network entity 105 as illustrated by and described with reference to FIG. 1. The device 210 also may be an example of a UE 115 or a network entity 105 as illustrated by and described with reference to FIG. 1.

In some implementations, the device 205 and the device 210 may support one or more configurations associated with MIMO operation. For example, the device 205 may include multiple antenna elements 215 (which may collectively or generally refer to any one or more of an antenna element 215-a, an antenna element 215-b, and an antenna element 215-c) and the device 210 may include multiple antenna elements 220 (which may collectively or generally refer to any one or more of an antenna element 220-a, an antenna element 220-b, and an antenna element 220-c) and the device 205 and the device 210 may use one or more of such antenna elements to establish multiple links 245 (which may collectively or generally refer to a link 245-a or a link 245-b). In some aspects, an antenna element 215 or an antenna element 220 used for transmitting may be equivalently referred to as a radiating element and either or both of the antenna elements 215 or the antenna elements 220 may be associated with or located on one or more microstrip patches. For example, an antenna element 215 or an antenna element 220 may be an example of a microstrip antenna (or a microstrip patch antenna), which may refer to an antenna that is printed directly onto a circuit board.

In some conditions, such as LOS conditions between the device 205 and the device 210, MIMO may be difficult to achieve as there may not be multiple transmission or reception channels. Further, the device 205 and the device 210 may communicate using any one or more sub-terahertz (THz) or THz frequencies or frequency spectrums, among other frequencies or frequency spectrums. A THz frequency may refer to frequencies in the range of $10^{12}$ Hz. A THz spectrum may refer to a frequency spectrum from approximately 100 GHz to approximately 10 THz (such as 10,000 GHz) and a wavelength of signaling sent using a THz frequency may range from approximately 3 millimeters to approximately 30 micrometers. A sub-THz frequency spectrum may range from approximately 90 GHz to approximately 300 GHz. The sub-THz spectrum may enable relatively higher data rates (such as approximately 1 terabyte per second (Tbps) or higher) and may provide a relatively large bandwidth of several tens of GHz. In some aspects, the sub-THz frequency range may be separated into different bands, such as a W-band ranging from approximately 92 GHz to approximately 115 GHz and a D-band ranging from approximately 130 GHz to approximately 175 GHz. Such high frequencies and small wavelengths may approach or be similar to propagation characteristics of visible light, which may further hinder a likelihood for successful wireless communication using such high frequencies and small wavelengths.

As such, the device 205 and the device 210 may use a lens or a dish antenna together with individual antenna elements 215 and antenna elements 220 to effectively obtain a high rank channel, even in LOS conditions or scenarios in which the device 205 and the device 210 communicate over relatively high frequencies (such as sub-THz or THz frequencies, among other examples of relatively higher frequencies), due to a relatively higher spatial resolution achieved by a high gain lens or dish. For example, the device 205 may use a lens 225 to focus signaling toward the device 210 from one or more of the transmitting elements (such as the antenna element 215-a) and may use the lens 225 to focus signaling from the device 210 toward one or more receiving elements (such as the antenna element 215-b). The device 210 may use a lens 230 to focus received signaling toward one or more of the receiving elements (such as the antenna element 220-a) and may use the lens 230 to focus signaling toward the device 205 from one or more transmitting elements (such as the antenna element 220-b).

For example, the device 205 may transmit first wireless signaling from the antenna element 215-a through the lens 225 via a directional beam 235-a and the lens 225 may focus (such as refract) the first wireless signaling toward the device 210 to establish the link 245-a. Similarly, the device 210 may transmit second wireless signaling from the antenna element 220-b through the lens 230 via a directional beam 240-b and the lens 230 may focus (such as refract) the second wireless signaling toward the device 205 to establish the link 245-b. The device 210 may likewise use the lens 230 to focus (such as refract) the first wireless signaling toward the antenna element 220-a via a directional beam 240-a and the device 205 may likewise use the lens 225 to focus (such as refract) the second wireless signaling toward the antenna element 215-b via a directional beam 235-b.

In some aspects, the lens 225 or the lens 230, or both, may be examples of dielectric lenses, such as polytetrafluoroethylene (PTFE) lenses, and may facilitate a pairing between elements of the device 205 and the device 210 (such as a pairing between the antenna element 215-a and the antenna element 220-a and between the antenna element 215-b and the antenna element 220-b). Such a pairing between elements of the device 205 and the device 210 may enable a controlling of cross-talk (by one or both of the device 205 and the device 210) between signaling sent via the link 245-a and signaling sent via the link 245-b. The link 245-a and the link 245-b may be approximately parallel with a straight line between the device 205 and the device 210, but may deviate from parallel in accordance with the lens 225 having a finite aperture.

In accordance with obtaining relatively higher spatial resolution via a lens (such as the lens 225 or the lens 230), a device (such as the device 205 or the device 210) may use such higher spatial resolution to support full-duplex operation. For example, the device 205 may use a first set of one or more antennas elements 215 (such as the antenna element 215-a) for transmission and may simultaneously use a second set of one or more antennas elements 215 (such as the antenna element 215-b) for reception. Similarly, the device 210 may use a first set of one or more antennas elements 220 (such as the antenna element 220-b) for transmission and may simultaneously use a second set of one or more antennas elements 220 (such as the antenna element 220-a) for reception. In a full-duplex system involving a device using a lens, a transmitted signal may reflect off the lens and create interference at a receiver (such as at the antenna element 215-b for the device 205 or at the antenna element 220-a for the device 210). Additional details relating to such reflection-based self-interference is illustrated by and described in more detail with reference to FIG. 3.

In some implementations, a device (such as the device 205 or the device 210) may support a lens design that facilitates an avoidance or mitigation of self-interference from reflection off a lens. As such, a device may use the lens to enable full-duplex operation while maintaining a high likelihood for successful communication (such as successful reception at one or more antenna elements while simultaneously transmitting via one or more other antenna elements). In some implementations, such a lens that is able to facilitate or otherwise enable full-duplex operation may be associated with a curvature of a first, antenna-facing surface that is associated with a relatively small radius. Additionally, or alternatively, the lens may include or have an anti-reflective coating to reduce reflection and, in some implementations, a thickness or depth of the anti-reflective coating may be associated with (such as calculated in accordance with) an angle that depends on a relative placement of a transmitting element and a receiving element. Additionally, or alternatively, a thickness or depth of the anti-reflective coating may be associated with (such as calculated in accordance with) one or more wavelengths at which a device can communicate. Further, in some implementations, the lens may include or have a multi-layer coating to reduce reflection in scenarios in which a device is capable of communicating (such as transmitting or receiving) wireless signaling using multiple different wavelengths.

As such, in the context of the device 205, the first wireless signaling transmitted from the antenna element 215-a may be directed away from the second signaling received by the antenna element 215-b in accordance with a direction of a transmission beam of incident signaling at the lens 225 (and in accordance with a direction of refracted signaling from the lens 225). The second wireless signaling received at the antenna element 215-b may be directed away from the first wireless signaling transmitted from the antenna element 215-a in accordance with the direction of the transmission beam of incident signaling at the lens 225 (and in accordance with the direction of refracted signaling from the lens 225). In accordance with such a directing of signaling away from other, potentially interfering signaling, the device 205 may simultaneously transmit and receive over a same radio frequency, over at least partially overlapping radio frequencies, or over relatively proximate radio frequencies.

In some implementations, to potentially further reduce interference from a reflection of the directional beam 235-a to the reception of signaling at the antenna element 215-b, the device 205 may apply a first set of one or more polarizations to signaling sent via the directional beam of 235-a via the link 245-a and the device 210 may apply a second set of one or more polarizations to signaling sent via the directional beam 240-b via the link 245-b. Likewise, the device 205 may receive the signaling via the link 245-b using the directional beam 235-b in accordance with the second set of one or more polarizations and the device 210 and the device 210 may receive the signaling via the link 245-*a* using the directional beam 240-*a* in accordance with the first set of one or more polarizations. As such, the device 205 and the device 210 may apply different polarizations to signaling sent via the link 245-*a* and signaling sent via the link 245-*b* to reduce a level of interference that such signaling may have on each other and to reduce a level of interference arising from reflections of such signaling off one or both of the lens 225 or the lens 230. In other words, the device 205 and the device 210 may apply different polarizations to a set of (such as all) beams transmitted from an antenna element 215 (any one or more of the antenna element 215-*a*, the antenna element 215-*b*, or the antenna element 215-*c*) and to a set of (such as all) beams transmitted from an antenna element 220 (any one or more of the antenna element 220-*a*, the antenna element 220-*b*, or the antenna element 220-*c*).

In some aspects, two linear polarizations (such as a vertical polarization and a horizontal polarization) can be applied to (such as used or employed for) each of the two sets of beams. Additionally, or alternatively, two circular polarizations (such as a clockwise polarization and a counter-clockwise polarization) can be applied to (such as used or employed for) each of the two sets of beams. Additionally, or alternatively, two elliptical polarizations with a 90-degree difference in a phase offset can be applied to (such as used or employed for) each of the two sets of beams. Signal waveforms from or associated with different polarizations may not interfere with each other (if the polarizations are not affected by the channel), which may facilitate the reduction in interference. In some implementations, two transmitting entities (such as an antenna element 215 and an antenna element 220) may coordinate for applying or employing different polarizations (such that an antenna element 215 uses a first polarization and an antenna element 220 uses a second polarization). For example, the two transmitting entities may exchange configuration messages at a setup stage and may coordinate on polarization usage via the configuration messages.

Further, the application or employment of different polarizations between the two sets of beams may reduce a total number of MIMO beams in the system (such as the entire system). Therefore, the device 205 or the device 210 may perform a comparison relating to whether or not to apply a polarization scheme, as application of a polarization scheme may reduce interference and potentially also reduce a total number of available MIMO beams. There may be situations, such as situations associated with a high signal-to-noise-and-interference-ratio (SINR), in which a higher number of MIMO beams (ranks) can overcome any extra interference among the beams and lead to a higher total data throughput. Alternatively, there may be situations, such as situations associated with a low SINR, in which a polarization scheme can overcome any extra interference among the beams and lead to a higher total data throughput. In other words, if the SINR is high, the device 205 and the device 210 may apply two polarizations on each beam and, if the SINR is low, the device 205 and the device 210 may apply a polarization scheme (such as apply one polarization per beam with different polarizations applied to different sets of beams). As such, the device 205 and the device 210 may select, identify, ascertain, or otherwise determine whether to apply different polarizations to different sets of beams based on an SINR measurement (which at least one of the device 205 or the device 210 may obtain via a measurement of one or more messages or reference signals).

Figure 3:
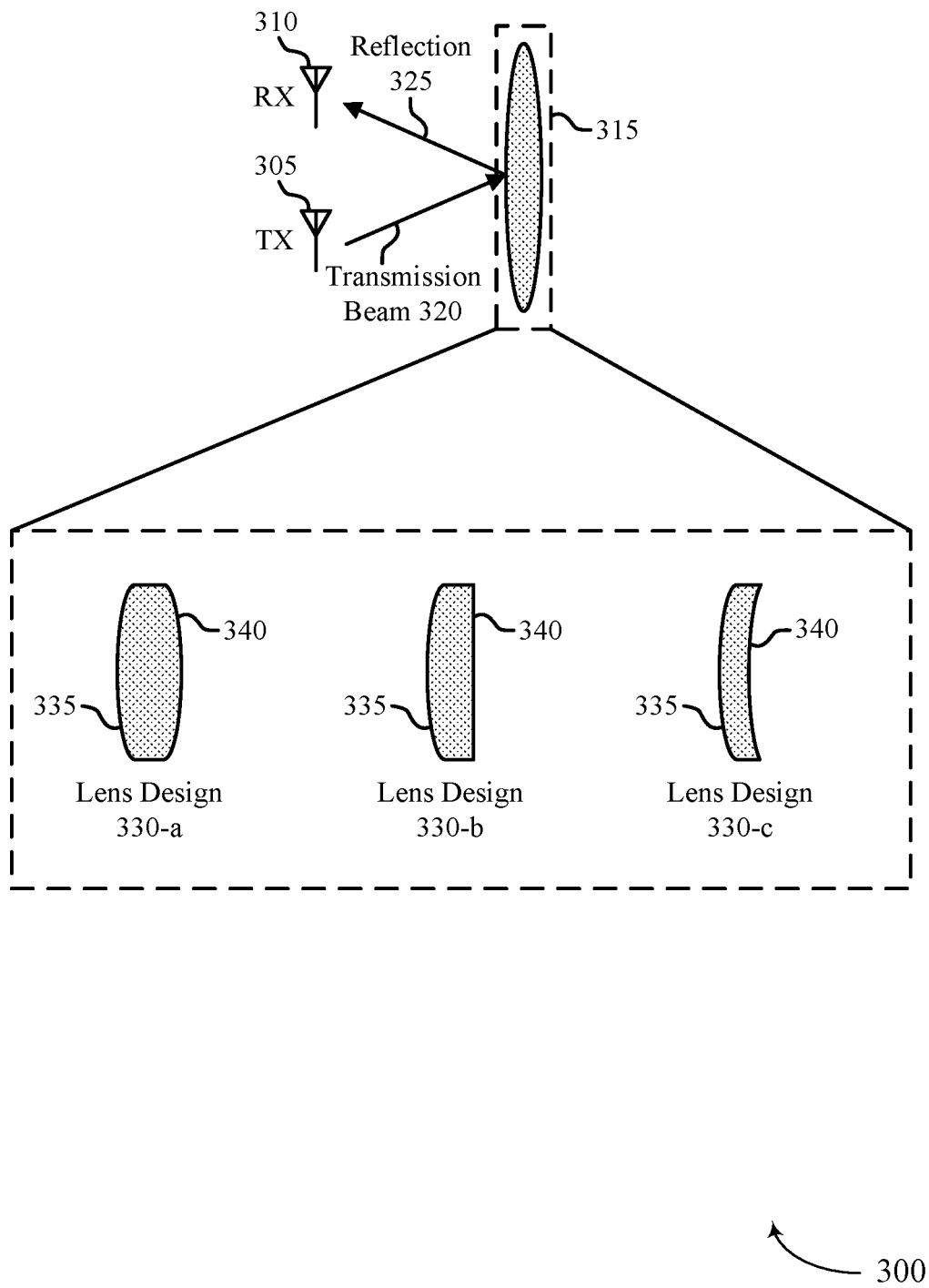
FIG. 3 shows an example transceiver and lens configuration that supports a lens design for full-duplex communication.

FIG. 3 shows an example transceiver and lens configuration 300 that supports lens design for full-duplex communication. The transceiver and lens configuration 300 may implement or be implemented to realize aspects of the wireless communications system 100 or the signaling diagram 200. For example, a device (such as the device 205 or the device 210) may communicate in accordance with a full-duplex operation and may avoid or mitigate reflection-based self-interference in accordance with the transceiver and lens configuration 300. In some implementations, for example, the device may leverage the transceiver and lens configuration 300 to disperse or otherwise orient any reflected signaling off a lens 315 (such as a lens 225 or a lens 230) away from a receiver of the device.

For example, the device may transmit first wireless signaling through the lens 315 via a transmitting element 305 (which may equivalently be referred to as a transmitting antenna) and may attempt to simultaneously receive second wireless signaling through the lens 315 at a receiving element 310 (which may equivalently be referred to as a receiving antenna). In some aspects, the device may transmit the first wireless signaling using a transmission beam 320 and the transmission beam 320 may be associated with or otherwise correspond to (such as cause) a reflection 325 off the lens 315. The reflection 325 may be oriented toward the receiving element 310, which may contribute to noise at the receiving element 310 or otherwise interfere with the second wireless signaling at the receiving element 310.

In accordance with the implementations described herein, the device may use a lens design 330 (which may refer to any of a lens design 330-*a*, a lens design 330-*b*, or a lens design 330-*c*) to enable or facilitate full-duplex operation with low or minimal self-interference arising from the reflection 325 off the lens 315. In some implementations, the device may use a lens 315 having a first surface 335 (which may be an example of an antenna-facing surface) and a second surface 340 (which may be an example of an outward- or receiver-facing surface) and the first surface 335 may have a first curvature associated with a relatively small first radius. For example, in accordance with the first curvature of the first surface 335 having a relatively small radius, the lens 315 may disperse or otherwise orient the reflection 325 away from the receiving element 310. In accordance with the transceiver and lens configuration 300, signaling from the transmitting element 305 may pass through the first surface 335 prior to passing through the second surface 340.

In some implementations, the first curvature of the first surface 335 or the second curvature of the second surface 340, or both, may be designed in accordance with a relative placement or location of the transmitting element 305 and the receiving element 310 such that the reflection 325 off the lens 315 from the transmission beam 320 avoids causing interference at the receiving element 310. For example, for a given placement of the transmitting element 305 and the receiving element 310, the first curvature may be configured such that the reflection 325 off the lens 315 avoids causing interference at the receiving element 310. Additionally, or alternatively, the first curvature of the first surface 335 or the second curvature of the second surface 340, or both, may be designed in accordance with a direction of the transmission beam 320 (or of multiple transmission beams that the transmitting element 305 may use) such that the reflection 325 off the lens 315 from the transmission beam 320 avoids causing interference at the receiving element 310. For example, the first curvature may be configured such that any reflections resulting from one or more transmission beams that the transmitting element may use are oriented away from the receiving element 310.

Additionally, or alternatively, the first curvature of the first surface 335 or the second curvature of the second surface 340, or both, may be designed in accordance with a wavelength of signaling transmitted or received by the device. Further, in addition, or as an alternative, to designing the first curvature and the second curvature in accordance with the relative placement of the transmitting element 305 and the receiving element 310, a direction of the transmission beam 320 that causes interference at the receiving element 310, or a wavelength of signaling, a material or refraction index n of the lens 315 may be selected in accordance with any one or more of such considerations. For example, the lens 315 may be designed to be made of PTFE (such as Teflon) and to have a refraction index n=1.4.

In some implementations, the device may use a lens design 330-a. The lens design 330-a may be associated with two curved surfaces. The lens design 330-a may be an example of a bi-convex lens design and the first curvature of the first surface 335 and the second curvature of the second surface 340 may be the same or approximately the same. In other words, a first radius of the first curvature and a second radius of the second curvature may be the same or approximately the same. Alternatively, the first radius of the first curvature may be smaller than the second radius of the second curvature.

For example, in some other implementations, the device may use a lens design 330-b. The lens design 330-b may be associated with one curved surface (such that the first surface 335 is curved and the second surface 340 is flat or uncurved). The lens design 330-b may be an example of a plano-convex lens design and a first radius of the first curvature of the first surface 335 may be smaller than a second radius of the second curvature of the second surface 340 (which may be uncurved and associated with a theoretically infinite radius). Additional details relating to the lens design 330-b are illustrated by and described in more detail with reference to FIG. 8.

In some other implementations, the device may use a lens design 330-c. The lens design 330-c may be associated with two curved surfaces. The lens design 330-c may be an example of a positive meniscus lens design and a first radius of the first curvature may be smaller than a second radius of the second curvature. In some aspects, the first curvature and the second curvature may be associated with a same direction of curvature (as the second curvature may be concave), which may assist in dispersing or otherwise orienting the reflection 325 away from the receiving element 310 as well as increase a likelihood for successfully receiving signaling from one or more other devices. The lens design 330-c may provide a relatively longer focal length or relatively greater aperture size, which may enable both a suitable dispersion of any reflected signaling off the lens 315 as well as a suitable quality of received signaling (as the second curvature of the second surface 340 may capture greater amounts of energy and provide more precise focusing).

Further, although illustrated by and described in the context of FIG. 3 as including one transmitting element 305 and one receiving element 310, the device may include multiple transmitting elements 305 or multiple receiving elements 310. In such implementations, the lens 315 may be configured such that reflections, off the lens 315, from any one or more of the transmitting elements 305 avoid causing interference at any one or more of the receiving elements 310 that are being used for simultaneous reception. Further, the device may use one or more lens designs 330. For example, the device may use a first lens design 330 for a first set of one or more transmitting elements 305 and receiving elements 310 and may use a second lens design 330 for a second set of one or more transmitting elements 305 and receiving elements 310. Further, although the various lens designs 330 are illustrated as two-dimensional to show the first surface 335 and the second surface 340, the lens designs 330 may be three-dimensional (such as spherical-like or half-spherical like).

Figure 4:
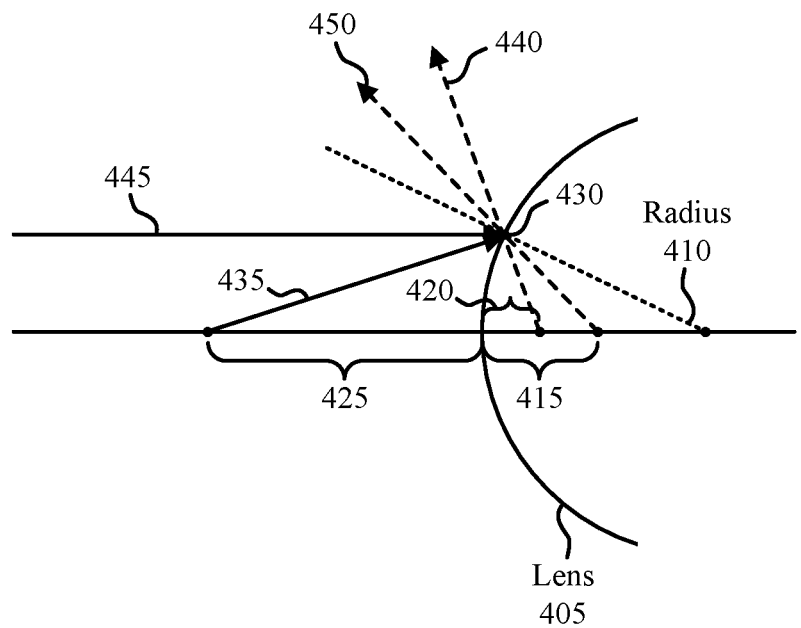
FIGS. 4 and 5 show example lens designs that support full-duplex communication.

FIG. 4 shows an example lens design 400 that supports full-duplex communication. The lens design 400 may implement or be implemented to realize aspects of the wireless communications system 100, the signaling diagram 200, or the transceiver and lens configuration 300. For example, a device (such as the device 205 or the device 210) may use a lens 405 (such as a lens 225, a lens 230, or a lens 315) associated with the lens design 400 to reflect or disperse signaling off the lens 405 away from a receiving element of the device.

In some implementations, the lens 405 may be associated with a radius 410 (which may have a value R) and the radius 410 of the lens 405 may be set or configured in accordance with a location or placement of a transmitting element and a receiving element of the device such that reflected signaling off the lens 405 from the transmitting element avoids causing interference at the receiving element. For example, and as described herein, the radius 410 may be relatively small such that a reflected transmitted signal is dispersed away from a receiving element in examples in which the device is in a full-duplex communication mode.

The lens 405 may be associated with a distance 415 (which may have a value of R/2), a distance 420 to a virtual focal length (which may have a value of −v), and a distance 425 to a point source or object (which may have a value of u). The virtual focal length may be associated with a direction 435 of incident signaling from the point source or object that intersects with a surface of the lens 405 at a point 430 and a direction 440 of reflected signaling off the surface of the lens 405 at the point 430. For illustrative purposes, a direction 445 (associated with a normal line or horizontal) of incident signaling that intersects with the surface of the lens at point 430 may be associated with a direction 450 of reflected signaling, which may be drawn from a point a distance 415 (such as a distance of −R/2) from the surface of the lens 405.

In scenarios in which a spherical lens is used, the reflection may be analyzed by optical imaging and, for a point source or object with a distance u (as illustrated by the distance 425) to the surface of the lens 405, a virtual image (such as a virtual imaging arising from the reflected signaling in the direction 440) may be at a location of −v (as illustrated by the distance 420) from the surface. A convex spherical reflective surface of a radius 410 (such as R) may have a virtual focal length of −R/2 (as illustrated by the distance 415, and which may be associated with an assumption under a paraxial condition). In some aspects, a value of v may be associated with or depend on R/2 and u. For example, a value of v may be defined in accordance with Equations 1 and 2.

$$\frac{1}{u} + \frac{1}{(-v)} = \frac{1}{\left(\frac{R}{2}\right)} \quad (1)$$

$$v = \frac{u\left(\frac{R}{2}\right)}{u+\left(\frac{R}{2}\right)} \quad (2)$$

Figure 5:
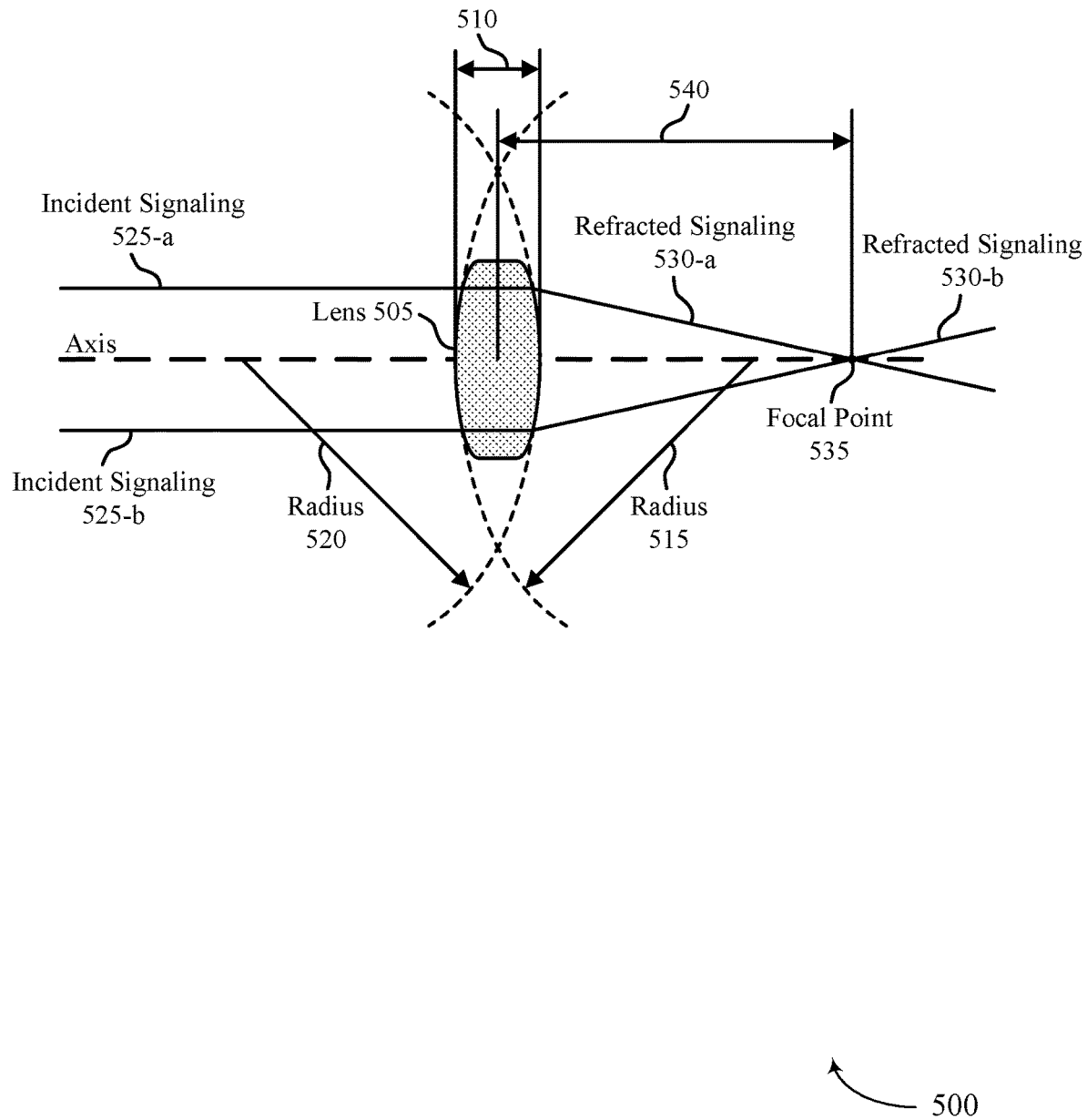

FIG. 5 shows an example lens design 500 that supports full-duplex communication. The lens design 500 may implement or be implemented to realize aspects of the wireless communications system 100, the signaling diagram 200, the transceiver and lens configuration 300, or the lens design 400. For example, a device (such as the device 205 or the device 210) may use a lens 505 (such as a lens 225, a lens 230, a lens 315, or a lens 405) associated with the lens design 500 to orient reflected signaling off the lens 505 away from a receiving element of the device and to focus signaling into the lens 505 for over-the-air propagation toward an intended receiving device.

The lens 505 may have a thickness 510 (which may have a value of d). The thickness 510 may be measured at a thickest part of the lens 505. For example, the lens 505 may be associated with two surfaces and one or both of the two surfaces may have a curvature such that a thickness of the lens 505 is not uniform. A first surface (such as an inward- or antenna-facing surface) of the lens 505 may have a first curvature associated with a radius 515 (which may have a value of $R_1$) and a second surface (such as an outward- or receiver-facing surface) of the lens 505 may have a second curvature associated with a radius 520 (which may have a value of $R_2$). In some aspects, the first surface may be referred to as a first side of the lens 505 and the second surface may be referred to as a second side of the lens 505.

The lens 505 may have a focal length 540 (which may have a value f, and which may be relatively long to achieve a paraxial approximation) and the focal length 540 may depend on the curvatures of both surfaces as well as a refraction index n of a material of the lens 505. For example, in accordance with the lens design 500, the lens 505 may refract incident signaling 525-a and incident signaling 525-b as refracted signaling 530-a and refracted signaling 530-b, respectively, and the refracted signaling 530-a and the refracted signaling 530-b may intersect at a focal point 535 (which may be a distance from a center of the lens 505 equal to the focal length 540). Various aspects of the lens design 500 may be defined in accordance with Equation 3. In implementations in which the lens 505 is thin (such as implementations in which d≈0), such aspects of the lens design 500 may simplify to Equation 4.

$$\frac{1}{f} = (n-1)\left[\frac{1}{R_1} - \frac{1}{R_2} + \frac{(n-1)d}{nR_1R_2}\right] \quad (3)$$

$$\frac{1}{f} = (n-1)\left[\frac{1}{R_1} - \frac{1}{R_2}\right] \quad (4)$$

In some implementations, Equations 3 and 4 may be calculated to ensure a suitable focal length 540 (such as f) while satisfying one or more criteria associated with $R_1$ and $R_2$ (such as a criterion associated with making $R_1$ relatively small). In some aspects, a suitable focal length 540 may be such that f=115 mm (approximately) at 500 GHz or such that f=151.5 mm (approximately) at 500 GHz. For example, in accordance with the implementations described herein, $R_1$ may be relatively small to enable or facilitate full-duplex operation with low or minimal self-interference arising from reflection off the lens 505 toward a receiving element of the device. To reduce interference from reflections off the lens 505, and in accordance with Equations 3 and 4, $|R_2|$ may be relatively large if the lens design 500 is associated with a bi-convex design (where $R_2$ may have a negative value for a bi-convex design). Alternatively, to reduce interference from reflections off the lens 505, the lens design 500 may be associated with a plano-convex or positive meniscus design.

Figure 6:
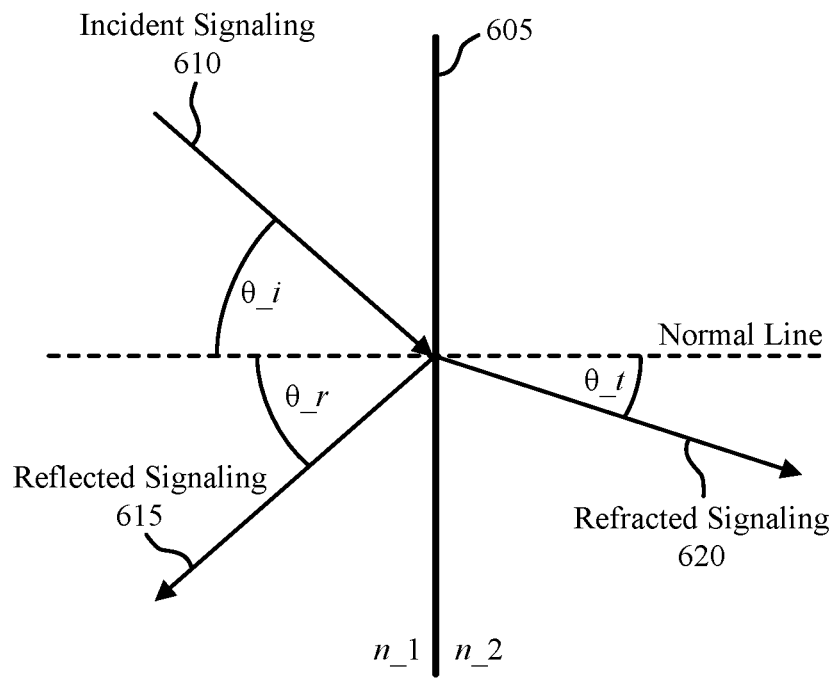
FIG. 6 shows an example anti-reflective coating interface diagram that supports a lens design for full-duplex communication.

FIG. 6 shows an example anti-reflective coating interface diagram 600 that supports a lens design for full-duplex communication. The anti-reflective coating interface diagram 600 may implement or be implemented to realize aspects of the wireless communications system 100, the signaling diagram 200, the transceiver and lens configuration 300, the lens design 400, or the lens design 500. For example, a device (such as the device 205 or the device 210) may use a lens (such as a lens 225, a lens 230, a lens 315, a lens 405, or a lens 505) for refracting outgoing signaling toward an intended receiving device and for refracting incoming signaling toward a receiving element of the device and the lens may be associated with a lens design that enables full-duplex operation at the device with low or minimal self-interference arising from reflections off the lens. In some implementations, the lens may include an anti-reflective coating to further support full-duplex operation at the device and the anti-reflective coating interface diagram 600 may illustrate an interface 605 between two layers of an anti-reflective coating, between air and a layer of an anti-reflective coating, or between an anti-reflective coating and the lens.

An anti-reflective coating may include one or more (transparent) thin film structures with alternating layers of contrasting refractive indices. A thickness of one or more layers of the alternating layers may be selected or configured to produce destructive interference in directional beams reflected from interfaces (such as interfaces between the alternating layers) and constructive interference in corresponding transmitted beams (such that transmitted signaling is focused into the lens). As such, the device may use an anti-reflective coating to further reduce reflection off the lens, which may be measured by a reflection coefficient (which may be denoted as R). A reflection coefficient may be measured at each interface of mediums having different refraction indices.

The interface 605 may illustrate an interface between a first medium (such as a first layer of an anti-reflective coating) and a second medium (such as a second layer of the anti-reflective coating or a lens) and a reflection coefficient of the interface 605 may be defined as a measure of reflectance (such as from "0" to "1") at the interface 605. The reflection coefficient may depend on a refraction index of each of the two mediums on either side of the interface 605. For example, for incident signaling 610 that is perpendicular to the anti-reflective coating or the lens, the reflection coefficient (R) may be defined in accordance with Equation 5, where $n_1$ is a refraction index for the first medium and $n_2$ is the refraction index for the second medium.

$$R = \left(\frac{n_1 - n_2}{n_1 + n_2}\right)^2 \quad (5)$$

Due to the usage of constructive and destructive interference by an anti-reflective coating to dissipate reflections off the lens and focus transmitted signaling into the lens, a performance of an anti-reflective coating may vary with wavelength and incident angle. As such, a reflection off the interface 605 may vary in accordance with an angle $\theta_i$ of incident signaling 610. For example, and as illustrated by FIG. 6, the incident signaling 610 may meet the interface 605 at an angle $\theta_i$, which may result in or otherwise be associated with reflected signaling 615 at an angle $\theta_r$, and refracted signaling 620 at an angle $\theta_t$. The reflection coefficient of the interface 605 may be polarization dependent (such that a reflection coefficient R can be represented as $R_s$ and $R_p$) and, in examples in which $\theta_i \neq 0$, may be defined in accordance with Equations 6 and 7.

$$R_s = \left| \frac{n_1 \cos \theta_i - n_2 \cos \theta_t}{n_1 \cos \theta_i + n_2 \cos \theta_t} \right|^2 = \left| \frac{n_1 \cos \theta_i - n_2 \sqrt{1 - \left(\frac{n_1}{n_2} \sin \theta_i\right)^2}}{n_1 \cos \theta_i + n_2 \sqrt{1 - \left(\frac{n_1}{n_2} \sin \theta_i\right)^2}} \right|^2 \quad (6)$$

$$R_p = \left| \frac{n_1 \cos \theta_t - n_2 \cos \theta_i}{n_1 \cos \theta_t + n_2 \cos \theta_i} \right|^2 = \left| \frac{n_1 \sqrt{1 - \left(\frac{n_1}{n_2} \sin \theta_i\right)^2} - n_2 \cos \theta_i}{n_1 \sqrt{1 - \left(\frac{n_1}{n_2} \sin \theta_i\right)^2} + n_2 \cos \theta_i} \right|^2 \quad (7)$$

Accordingly, in some implementations, a design or construction of an anti-reflective coating may depend on or be associated with a relative placement of the transmitting element and the receiving element (which may dictate or otherwise be associated with an incident angle of signaling at an anti-reflective coating or lens). Such a design or construction may include a selection of one or more of a quantity of layers of the anti-reflective coating, a selection for refraction indices of one or more layers of the anti-reflective coating, a thickness or depth for one or more layers of the anti-reflective coating, and a quantity of different anti-reflective coatings.

For example, the device may select or use a depth or thickness for an anti-reflective coating in accordance with angle $\theta_i$ of the incident signaling 610. In some implementations, the depth or thickness of the anti-reflective coating may be selected or chosen in accordance with an angle $\theta_i$ that results in or is otherwise associated with an angle $\theta_r$ of the reflected signaling 615 that causes interference at a receiving element of the device (such that a directional beam associated with the angle $\theta_r$ is oriented toward the receiving element). For perpendicular incident signaling 610 (such that $\theta_i = 0$), a suitable or optimal depth of a first coating layer may be equal to $\lambda_1/4$.

Additionally, or alternatively, the device may select or use an $n_1$ for a minimum or reduced reflection in accordance with applying the reflection coefficient to a second interface and minimizing or reducing a total reflection (which may be associated with a product of reflection coefficients across multiple interfaces 605). In some scenarios, there may be a relatively larger difference between suitable or optimal refraction indices for the different polarizations. In such scenarios, the device may select or use an incident angle for one polarization and may switch the other polarization off for the direction in which a reflection off a lens interferes with a receiving element. In other words, the device may refrain from generating signaling associated with a non-selected polarization for a transmission direction that may result in reflection-based interference at a receiving element.

Additionally, or alternatively, a design or construction of an anti-reflective coating may depend on or be associated with one or more wavelengths over which the device transmits or receives. For example, a depth or thickness of the anti-reflective coating or a quantity of anti-reflective coatings may depend on or be associated with which wavelengths the device uses for wireless communications and a quantity of anti-reflective coatings that the device uses may depend on or be associated with a quantity of different sets of one or more wavelengths the device uses or is capable of using. In some implementations, for example, a first design of an anti-reflective coating may achieve sufficient destructive interference for reflections of signaling having a first set of one or more wavelengths and a second design of an anti-reflective coating may achieve sufficient destructive interference for reflections of signaling have a second set of one or more wavelengths. Additional details relating to a depth or thickness of an anti-reflective coating or a quantity of anti-reflective coatings are illustrated by and described in more detail with reference to FIG. 7.

Figure 7:
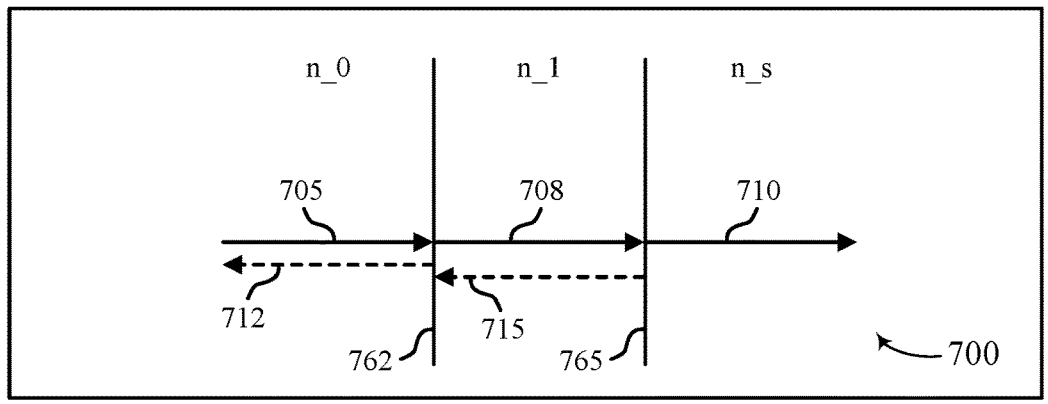
FIG. 7 shows example reflection diagrams that support a lens design for full-duplex communication.
Figure 7:
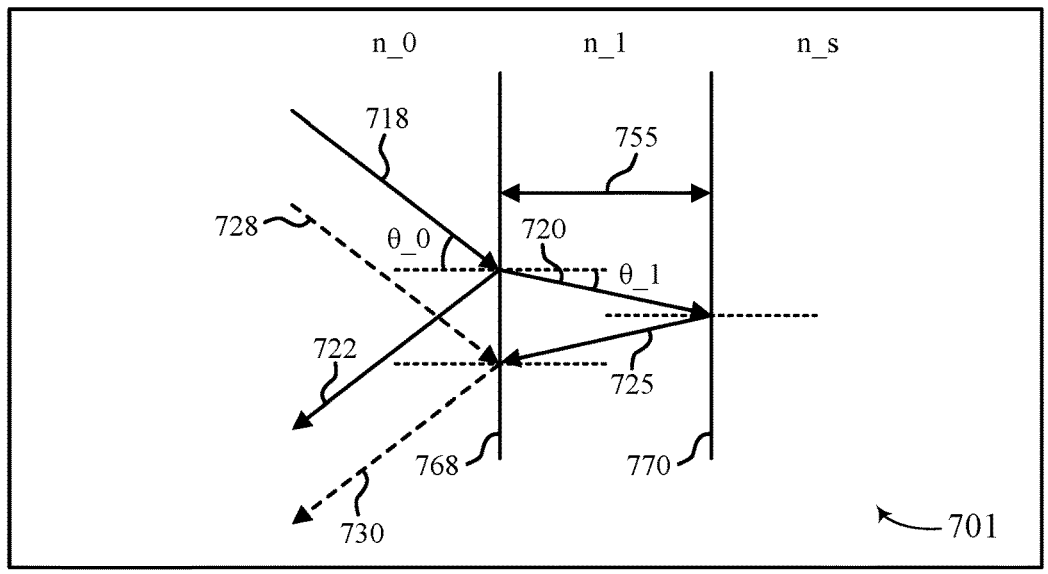
Figure 7:
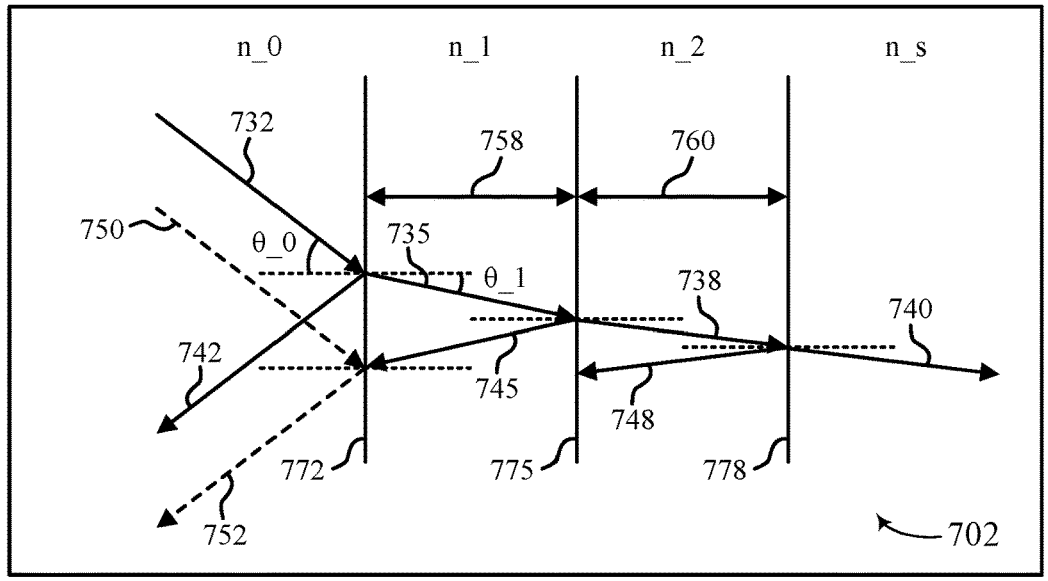

FIG. 7 shows example reflection diagrams 700 that support a lens design for full-duplex communication. The reflection diagrams 700, 701, and 702 may implement or be implemented to realize aspects of the wireless communications system 100, the signaling diagram 200, the transceiver and lens configuration 300, the lens design 400, the lens design 500, or the anti-reflective coating interface diagram 600. For example, the reflection diagrams 700, 701, and 702 may each illustrate how incident signaling from a device (such as the device 205 or the device 210) both reflects off an interface between two mediums and refracts through the interface between the two mediums in examples in which the two mediums have different refraction indices. The interfaces illustrated in the reflection diagrams 700, 701, and 702 may be interfaces between a first layer of an anti-reflective coating and a second layer of an anti-reflective coating, between a layer of an anti-reflective coating and a lens (such as a lens 225, a lens 230, a lens 315, a lens 405, or a lens 505), between air and a layer of an anti-reflective coating or a lens, or any combination thereof.

The reflection diagram 700 illustrates an example in which signaling propagates through a first medium associated with a refraction index $n_0$, a second medium associated with a refraction index $n_1$, and a third medium associated with a refraction index $n_s$. As shown in the reflection diagram 700, incident signaling 705 may be perpendicular to an interface 762 between the first medium and the second medium and, as such, refracted signaling 708 may be oriented in a same direction as the incident signaling 705. Likewise, reflected signaling 712 off the interface 762 may be perpendicular to the interface 762. The refracted signaling 708 may be perpendicular to an interface 765 between the second medium and the third medium and, as such, refracted signaling 710 may be oriented in a same direction as the refracted signaling 708. Likewise, reflected signaling 715 off the interface 765 may be perpendicular to the interface 765. In some implementations, for an anti-reflecting coating between the first medium and the third medium (such that the second medium represents an anti-reflective coating), a suitable or optimal choice of $n_1$ may be defined in accordance with Equation 8. Further, although described herein as a selection for a refraction index $n_1$ of an anti-reflective coating, a material for a lens may be similarly selected to achieve a specific or suitable refraction index $n_1$.

$$n_1 = \sqrt{n_0 n_s} \quad (8)$$

The reflection diagram 701 illustrates another example in which signaling propagates through a first medium associated with a refraction index $n_0$, a second medium associated with a refraction index $n_1$, and a third medium associated with a refraction index $n_s$. As shown in the reflection diagram 701, incident signaling 718 may meet an interface 768 between the first medium and the second medium at an angle $\theta_0$ and refracted signaling 720 may leave the interface 768 at an angle $\theta_1$. Reflected signaling 722 (which may be an example of a reflection of the incident signaling 718) may reflect off the interface 768 and reflected signaling 725 (which may be an example of a reflection of the refracted signaling 720) may reflect off an interface 770 between the second medium and the third medium. In some aspects, the reflected signaling 725 may intersect with incident signaling 728 at a point on the interface 768 and the incident signaling 728 may cause reflected signaling 730 off the interface 768.

In some implementations, a light path (such as a path of wireless signaling) in the second medium may be defined in accordance with $$\frac{2n_1 D}{\cos(\theta_1)}$$

and a light path difference in the first medium between the incident signaling 718 and the incident signaling 728 may be defined in accordance with $2Dn_0 \tan(\theta_1)\sin(\theta_0)$. As such, in implementations in which the second medium is an example of an anti-reflective coating, a thickness 755 of the anti-reflective coating may be defined in accordance with Equations 9 and 10. In some aspects, Equation 9 may be associated with calculating a suitable or optimal value for the thickness 755, which may be defined as D.

$$\frac{2n_1 D}{\cos(\theta_1)} - 2Dn_0 \tan(\theta_1)\sin(\theta_0) = \frac{\lambda_0}{2} \quad (9)$$

$$\frac{2D}{\cos(\theta_1)}[n_1 - n_0 \sin(\theta_1)\sin(\theta_0)] = \frac{\lambda_0}{2} \quad (10)$$

In accordance with Equations 9 and 10, if $\theta_0=0$, a suitable or optimal value D for the thickness 755 of the anti-reflective coating may be $D=\lambda_0/4$, where $\lambda_0$ is a wavelength of the transmitted signaling. If $\theta_0 \neq 0$, a suitable or optimal value D for the thickness 755 of the anti-reflective coating may be dependent on $\theta_0$ and may be such that $D<\lambda_0/4$. For designing or configuring the thickness 755 of the anti-reflective coating of a lens that enables full-duplex operation, $\theta_0$ may be selected or chosen as the angle for a transmission beam from a transmitting element that causes a reflection, off the lens, that is pointed or oriented toward a receiving element.

The reflection diagram 702 illustrates an example in which signaling propagates through a first medium associated with a refraction index $n_0$, a second medium associated with a refraction index $n_1$, a third medium associated with a refraction index $n_2$, and a fourth medium associated with a refraction index $n_s$. As shown in the reflection diagram 701, incident signaling 732 may meet an interface 772 between the first medium and the second medium at an angle $\theta_0$ and refracted signaling 735 may leave the interface 772 at an angle $\theta_1$. Reflected signaling 742 (which may be an example of a reflection of the incident signaling 732) may reflect off the interface 772 and reflected signaling 745 (which may be an example of a reflection of the refracted signaling 735) may reflect off an interface 775 between the second medium and the third medium. In some aspects, the reflected signaling 745 may intersect with incident signaling 750 at a point on the interface 772 and the incident signaling 750 may cause reflected signaling 752 off the interface 772. The refracted signaling 735 may provide refracted signaling 738 after the interface 775 and the refracted signaling 738 may meet an interface 778 between the third medium and the fourth medium at an angle. The refracted signaling 738 may cause reflected signaling 748 off the interface 778 and refracted signaling 740 after the interface 778.

In some implementations, the second medium and the third medium may be examples of different anti-reflective coatings and each may have a thickness in accordance with a set of wavelengths over which a device communicates or over which the device is capable of communicating. For example, the second medium (such as a first anti-reflective coating) may have a thickness 758 and the third medium (such as a second anti-reflective coating) may have a thickness 760 in accordance with suitable or optimal values for a thickness of an anti-reflective coating depending on a wavelength. As such, if the device communicates over two different wavelengths, or two different sets of one or more wavelengths (such as two different ranges of wavelengths), the device may use a lens that includes two anti-reflective coatings and each may have a different thickness. For example, if a bandwidth over which the device can transmit or receive is relatively wide, as may be possible in some high frequency systems (such as sub-THz or THz systems), the device may employ a multi-layer anti-reflective coating to reduce reflections off a lens for signaling associated with various frequencies within the bandwidth over which the device can transmit or receive.

Figure 8:
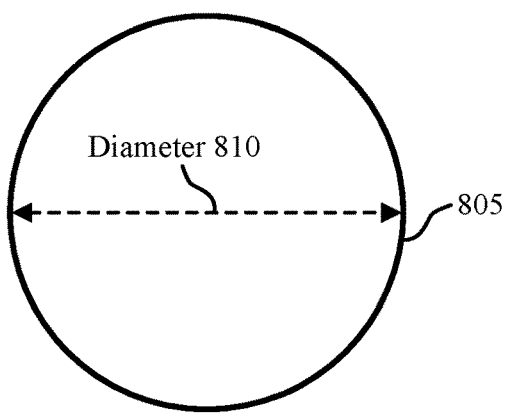
FIGS. 8 and 9 show example lens designs that support full-duplex communication.
Figure 8:
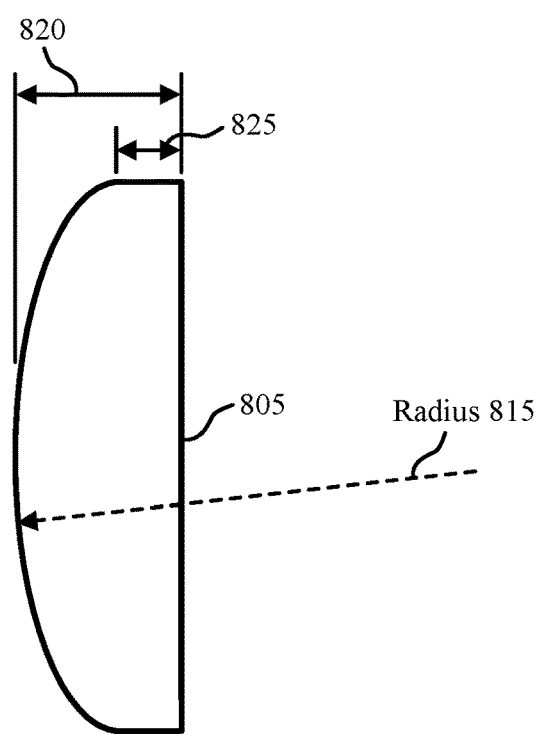
Figure 8:

FIG. 8 shows an example lens design 800 that supports full-duplex communication. The lens design 800 may implement or be implemented to realize aspects of the wireless communications system 100, the signaling diagram 200, the transceiver and lens configuration 300, the lens design 400, the lens design 500, the anti-reflective coating interface diagram 600, or any of the reflection diagrams 700, 701, and 702. For example, a device (such as a device 205 or a device 210) may use a lens 805 (such as a lens 225, a lens 230, a lens 315, a lens 405, or a lens 505) configured in accordance with the lens design 800 to disperse or otherwise orient reflected signaling off the lens 805 away from a receiving element of the device. The lens design 800 may be example of a lens design 330-b as illustrated by and described with reference to FIG. 3 and, as such, the lens 805 may have a first surface associated with a first curvature and a second surface that is flat. In other words, the lens design 800 may illustrate a plano-convex lens design.

In some implementations, various dimensions of the lens 805 designed in accordance with the lens design 800 may be such that a diameter 810 of the lens 805 may be approximately 101.6 mm and a radius 815 of the first curvature of the first surface may be approximately 65.2 mm. In accordance with the implementations described herein, the radius 815 may be set or configured in accordance with a relative placement of a transmitting element and a receiving element, a transmission beam from the transmitting element that may cause reflection-based self-interference at the receiving element, or a wavelength of signaling used by the transmitting element or the receiving element. In some implementations, a thickness 820 (such as a width) of the lens 805 may be approximately 30.0 mm and a thickness 825 of a portion of the lens 805 excluding the first curvature may be approximately 5.7 mm.

Figure 9:
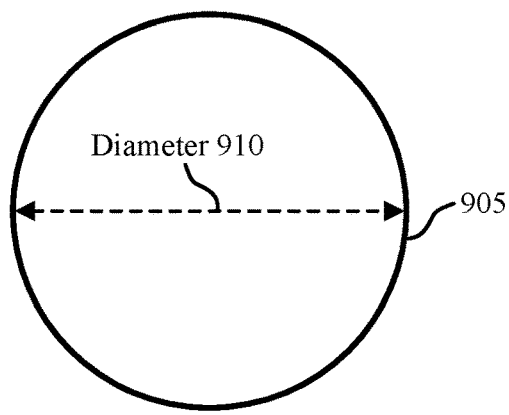
Figure 9:
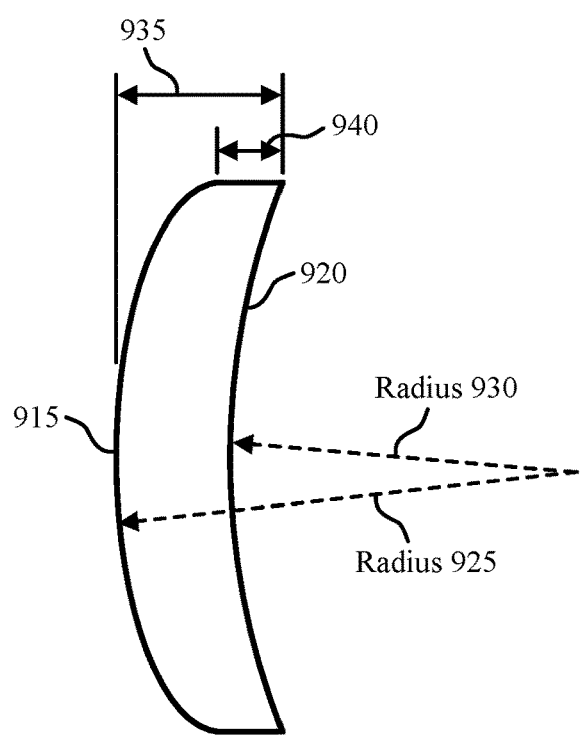
Figure 9:

FIG. 9 shows an example lens design 900 that supports full-duplex communication. The lens design 900 may implement or be implemented to realize aspects of the wireless communications system 100, the signaling diagram 200, the transceiver and lens configuration 300, the lens design 400, the lens design 500, the anti-reflective coating interface diagram 600, or any of the reflection diagrams 700, 701, and 702. For example, a device (such as a device 205 or a device 210) may use a lens 905 (such as a lens 225, a lens 230, a lens 315, a lens 405, or a lens 505) configured in accordance with the lens design 900 to disperse or otherwise orient reflected signaling off the lens 905 away from a receiving element of the device. The lens design 900 may be example of a lens design 330-c as illustrated by and described with reference to FIG. 3 and, as such, the lens 905 may have a first surface 915 associated with a first curvature and a second surface 920 associated with a second curvature. In other words, the lens design 900 may illustrate a positive meniscus lens design.

In some implementations, various dimensions of the lens 905 designed in accordance with the lens design 900 may be such that a diameter 910 of the lens 905 may be approximately 101.6 mm. A radius 925 of the first curvature of the first surface 915 and a radius 930 of the second curvature of the second surface 920 may be the same (or approximately the same) or may be different. Further, although the radius 925 and the radius 930 are illustrated as originating from a common point, the radius 925 and the radius 930 may originate from any points. For example, a sphere (such as a hypothetical sphere) associated with the radius 925 may have a same or different center point as compared to a sphere (such as a hypothetical sphere) associated with the radius 930. In accordance with the implementations described herein, the radius 925 and the radius 930 may be set or configured in accordance with a relative placement of a transmitting element and a receiving element, a transmission beam from the transmitting element that may cause reflection-based self-interference at the receiving element, or a wavelength of signaling used by the transmitting element or the receiving element. In some implementations, a thickness 935 (such as a width) of the lens 905 may be approximately 30.0 mm and a thickness 940 of a portion of the lens 905 excluding the first curvature may be approximately 5.7 mm.

Figure 10:
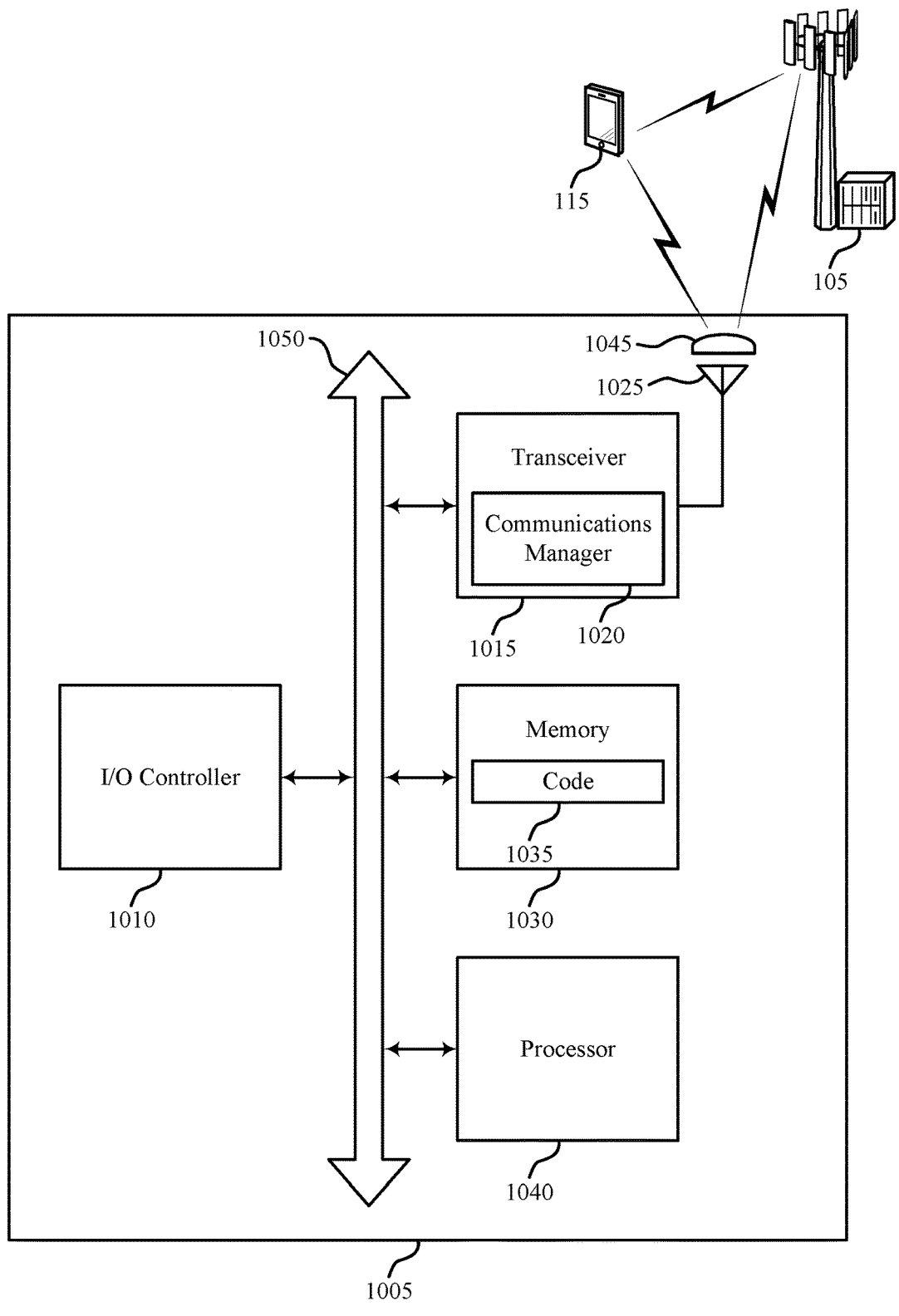
FIGS. 10 and 11 show block diagrams of example devices that support a lens design for full-duplex communication.

FIG. 10 shows a block diagram 1000 of an example device 1005 that supports a lens design for full-duplex communication. The device 1005 may communicate (such as wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, a processor 1040, and a lens 1045. These components may be in electronic communication or otherwise coupled (such as operatively, communicatively, functionally, electronically, electrically) via one or more buses (such as a bus 1050).

The I/O controller 1010 may manage input and output signals for the device 1005. The I/O controller 1010 also may manage peripherals not integrated into the device 1005. In some implementations, the I/O controller 1010 may represent a physical connection or port to an external peripheral. In some implementations, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some implementations, the I/O controller 1010 may be implemented as part of a processor or processing system, such as the processor 1040. In some implementations, a user may interact with the device 1005 via the I/O controller 1010 or via hardware components controlled by the I/O controller 1010.

In some implementations, the device 1005 may include a single antenna 1025. However, in some other implementations, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 also may include a modem to modulate the packets, to provide the modulated packets to one or more antennas 1025 for transmission, and to demodulate packets received from the one or more antennas 1025.

In some implementations, the transceiver 1015 may include one or more interfaces, such as one or more interfaces coupled with the one or more antennas 1025 that are configured to support various receiving or obtaining operations, or one or more interfaces coupled with the one or more antennas 1025 that are configured to support various transmitting or outputting operations, or a combination thereof. In some implementations, the transceiver 1015 may include or be configured for coupling with one or more processors or memory components that are operable to perform or support operations in accordance with received or obtained information or signals, or to generate information or other signals for transmission or other outputting, or any combination thereof. In some implementations, the transceiver 1015, or the transceiver 1015 and the one or more antennas 1025, or the transceiver 1015 and the one or more antennas 1025 and one or more processors or memory components (such as the processor 1040, or the memory 1030, or both), may be included in a chip or chip assembly that is installed in the device 1005.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some implementations, the code 1035 may not be directly executable by the processor 1040 but may cause a computer (such as when compiled and executed) to perform functions described herein. In some implementations, the memory 1030 may contain, among other things, a basic I/O system (BIOS) which may control basic hardware or software operation such as the interaction with peripheral components or devices.

The processor 1040 may be any one or more suitable processors capable of executing scripts or instructions of one or more software programs stored in the device 1005 (such as within the memory 1030). In some implementations, the processor 1040 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005, such as the processor 1040, or the transceiver 1015, or the communications manager 1020, or other components or combinations of components of the device 1005.

The processing system of the device 1005 may interface with other components of the device 1005, and may process information received from other components (such as inputs or signals) or output information to other components. For example, a chip or modem of the device 1005 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1005 may transmit information output from the chip or modem. In some implementations, the second interface may refer to an interface between the processing system of the chip or modem and a receiver, such that the device 1005 may obtain information or signal inputs, and the information may be passed to the processing system. A person having ordinary skill in the art will readily recognize that the first interface also may obtain information or signal inputs, and the second interface also may output information or signal outputs.

The communications manager 1020 may support wireless communication at a device in accordance with examples as disclosed herein. For example, the communications manager 1020 may be configured as or otherwise support a means for transmitting, through a lens 1045 via a transmitting element of the device, first signaling, the lens 1045 including a first surface associated with a first curvature. The communications manager 1020 may be configured as or otherwise support a means for receiving, through the lens 1045 via a receiving element of the device, second signaling, where the first curvature of the first surface enables simultaneous transmission by the transmitting element in a first direction of incident signaling at the lens 1045 and reception by the receiving element at a second direction of refracted signaling from the lens 1045 to the receiving element.

In some implementations, the lens 1045 further includes an anti-reflective coating. In some implementations, a thickness of the anti-reflective coating is associated with an angle of a transmission beam from the transmitting element that corresponds to a reflection, off the lens 1045 in accordance with the first curvature, toward the receiving element.

In some implementations, the first curvature is configured to dissipate the reflection off the lens 1045 toward the receiving element and focus signaling associated with the transmission beam into the lens 1045.

In some implementations, the thickness of the anti-reflective coating is further associated with a set of one or more wavelengths used for the transmission by the transmitting element or the reception by the receiving element.

In some implementations, the lens 1045 further includes multiple anti-reflective coatings at different thicknesses and different anti-reflective coatings of the multiple anti-reflective coatings are associated with different sets of one or more wavelengths used for the transmission by the transmitting element or the reception by the receiving element.

In some implementations, the lens 1045 further includes a second surface associated with a second curvature and the first direction of incident signaling at the lens 1045 and the second direction of refracted signaling from the lens 1045 are associated with a first radius of the first surface and a second radius of the second surface. In some implementations, the first signaling transmitted from the transmitting element is directed away from the second signaling received by the receiving element in accordance with the first direction of incident signaling at the lens 1045 and the second direction of refracted signaling from the lens 1045. In some implementations, the second signaling received at the receiving element is directed away from the first signaling transmitted from the transmitting element in accordance with the first direction of incident signaling at the lens 1045 and the second direction of refracted signaling from the lens 1045.

In some implementations, the first radius of the first curvature is smaller than the second radius of the second curvature. In some implementations, signaling from the transmitting element passes through the first surface of the lens 1045 prior to the second surface of the lens 1045. In some implementations, the transmission by the transmitting element and the reception by the receiving element at least partially overlap in frequency. In some implementations, the lens 1045 is a plano-convex lens or a positive meniscus lens.

In some implementations, the communications manager 1020 may be configured to perform various operations (such as receiving, monitoring, transmitting) using or otherwise in cooperation with the transceiver 1015, the one or more antennas 1025, or any combination thereof. Although the communications manager 1020 is illustrated as a separate component, in some implementations, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to support various aspects of a lens design for full-duplex communication as described herein, or the processor 1040 and the memory 1030 may be otherwise configured to perform or support such operations.

Figure 11:
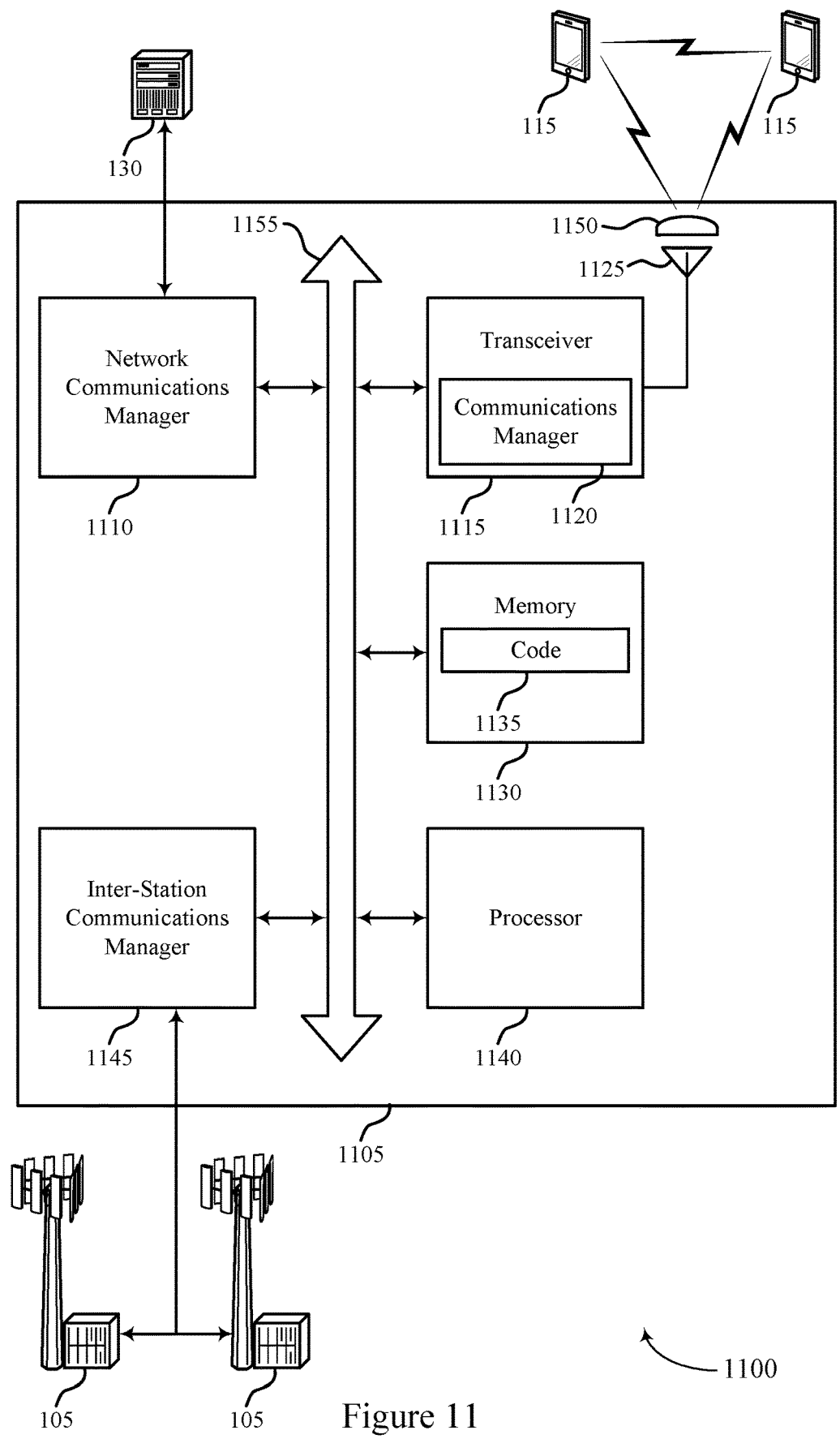

FIG. 11 shows a block diagram 1100 of an example device 1105 that supports a lens design for full-duplex communication. The device 1105 may communicate (such as wirelessly) with one or more network entities 105, one or more UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, an inter-station communications manager 1145, and a lens 1150. These components may be in electronic communication or otherwise coupled (such as operatively, communicatively, functionally, electronically, electrically) via one or more buses (such as a bus 1055).

The network communications manager 1110 may manage communications with a core network 130 (such as via one or more wired backhaul links). For example, the network communications manager 1110 may manage the transfer of data communications for client devices, such as one or more UEs 115.

In some implementations, the device 1105 may include a single antenna 1125. However, in some other implementations, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 also may include a modem to modulate the packets, to provide the modulated packets to one or more antennas 1125 for transmission, and to demodulate packets received from the one or more antennas 1125.

In some implementations, the transceiver 1115 may include one or more interfaces, such as one or more interfaces coupled with the one or more antennas 1125 that are configured to support various receiving or obtaining operations, or one or more interfaces coupled with the one or more antennas 1125 that are configured to support various transmitting or outputting operations, or a combination thereof. In some implementations, the transceiver 1115 may include or be configured for coupling with one or more processors or memory components that are operable to perform or support operations in accordance with received or obtained information or signals, or to generate information or other signals for transmission or other outputting, or any combination thereof. In some implementations, the transceiver 1115, or the transceiver 1115 and the one or more antennas 1125, or the transceiver 1115 and the one or more antennas 1125 and one or more processors or memory components (such as the processor 1140, or the memory 1130, or both), may be included in a chip or chip assembly that is installed in the device 1105.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some implementations, the code 1135 may not be directly executable by the processor 1140 but may cause a computer (such as when compiled and executed) to perform functions described herein. In some implementations, the memory 1130 may contain, among other things, a BIOS which may control basic hardware or software operation such as the interaction with peripheral components or devices.

The processor 1140 may be any one or more suitable processors capable of executing scripts or instructions of one or more software programs stored in the device 1105 (such as within the memory 1130). In some implementations, the processor 1140 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1140, or the transceiver 1115, or the communications manager 1120, or other components or combinations of components of the device 1105.

The processing system of the device 1105 may interface with other components of the device 1105, and may process information received from other components (such as inputs or signals) or output information to other components. For example, a chip or modem of the device 1105 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1105 may transmit information output from the chip or modem. In some implementations, the second interface may refer to an interface between the processing system of the chip or modem and a receiver, such that the device 1105 may obtain information or signal inputs, and the information may be passed to the processing system. A person having ordinary skill in the art will readily recognize that the first interface also may obtain information or signal inputs, and the second interface also may output information or signal outputs.

The inter-station communications manager 1145 may manage communications with other network entities 105, and may include a controller or scheduler for controlling communications with UEs 115 in cooperation with other network entities 105. For example, the inter-station communications manager 1145 may coordinate scheduling for transmissions to UEs 115 for various interference mitigation techniques such as beamforming or joint transmission. In some implementations, the inter-station communications manager 1145 may provide an X2 interface within an LTE/LTE-A wireless communications network technology to provide communication between network entities 105.

The communications manager 1120 may support wireless communication at a device in accordance with examples as disclosed herein. For example, the communications manager 1120 may be configured as or otherwise support a means for transmitting, through a lens 1150 via a transmitting element of the device, first signaling, the lens 1150 including a first surface associated with a first curvature. The communications manager 1120 may be configured as or otherwise support a means for receiving, through the lens 1150 via a receiving element of the device, second signaling, where the first curvature of the first surface enables simultaneous transmission by the transmitting element in a first direction of incident signaling at the lens 1150 and reception by the receiving element at a second direction of refracted signaling from the lens 1150 to the receiving element.

In some implementations, the lens 1150 further includes an anti-reflective coating. In some implementations, a thickness of the anti-reflective coating is associated with an angle of a transmission beam from the transmitting element that corresponds to a reflection, off the lens 1150 in accordance with the first curvature, toward the receiving element.

In some implementations, the first curvature is configured to dissipate the reflection off the lens 1150 toward the receiving element and focus signaling associated with the transmission beam into the lens 1150.

In some implementations, the thickness of the anti-reflective coating is further associated with a set of one or more wavelengths used for the transmission by the transmitting element or the reception by the receiving element.

In some implementations, the lens 1150 further includes multiple anti-reflective coatings at different thicknesses and different anti-reflective coatings of the multiple anti-reflective coatings are associated with different sets of one or more wavelengths used for the transmission by the transmitting element or the reception by the receiving element.

In some implementations, the lens 1150 further includes a second surface associated with a second curvature and the first direction of incident signaling at the lens 1150 and the second direction of refracted signaling from the lens 1150 are associated with a first radius of the first surface and a second radius of the second surface. In some implementations, the first signaling transmitted from the transmitting element is directed away from the second signaling received by the receiving element in accordance with the first direction of incident signaling at the lens 1150 and the second direction of refracted signaling from the lens 1150. In some implementations, the second signaling received at the receiving element is directed away from the first signaling transmitted from the transmitting element in accordance with the first direction of incident signaling at the lens 1150 and the second direction of refracted signaling from the lens 1150.

In some implementations, the first radius of the first curvature is smaller than the second radius of the second curvature. In some implementations, signaling from the transmitting element passes through the first surface of the lens 1150 prior to the second surface of the lens 1150. In some implementations, the transmission by the transmitting element and the reception by the receiving element at least partially overlap in frequency. In some implementations, the lens 1150 is a plano-convex lens or a positive meniscus lens.

In some implementations, the communications manager 1120 may be configured to perform various operations (such as receiving, monitoring, transmitting) using or otherwise in cooperation with the transceiver 1115, the one or more antennas 1125, or any combination thereof. Although the communications manager 1120 is illustrated as a separate component, in some implementations, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to support various aspects of a lens design for full-duplex communication as described herein, or the processor 1140 and the memory 1130 may be otherwise configured to perform or support such operations.

Figure 12:
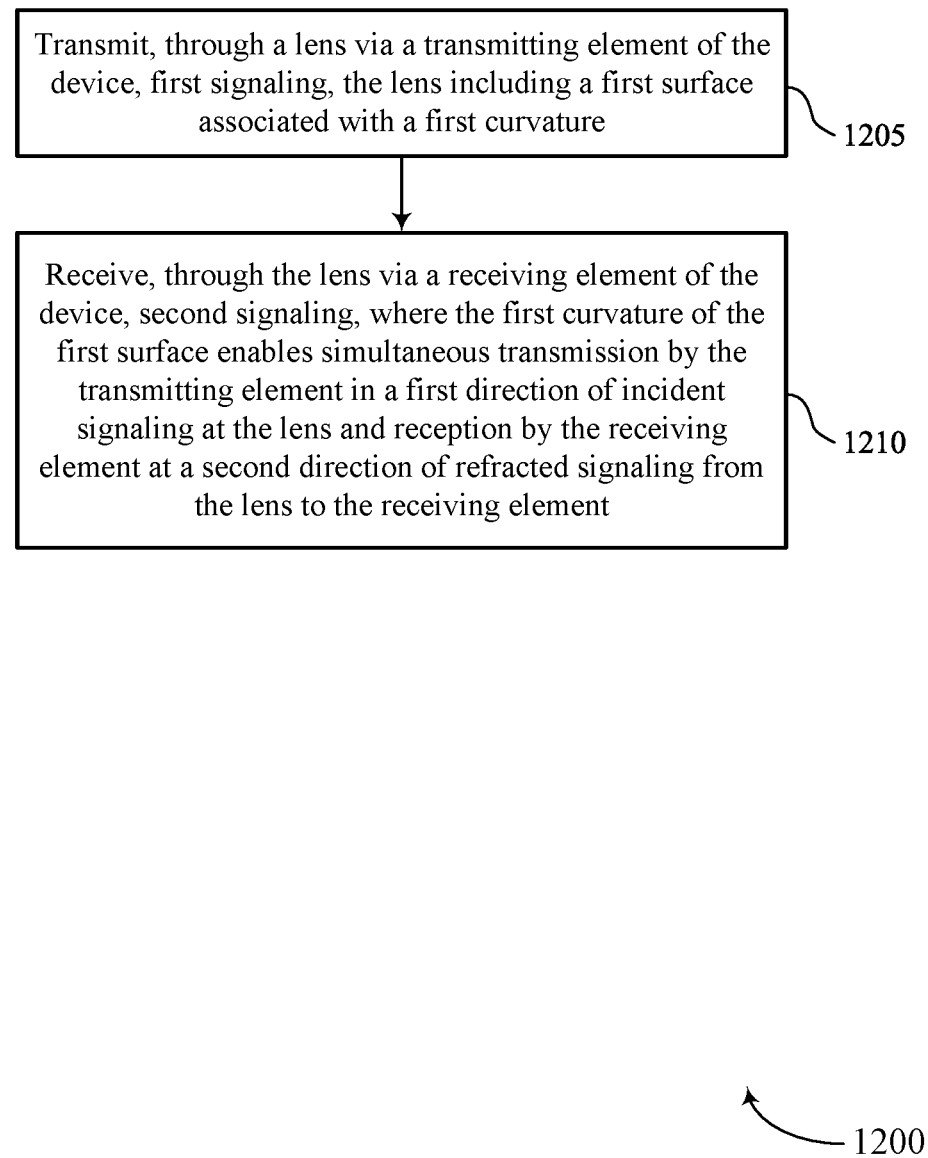
FIG. 12 shows a flowchart illustrating example methods that support a lens design for full-duplex communication.

FIG. 12 shows a flowchart illustrating an example method 1200 that supports a lens design for full-duplex communication. The operations of the method 1200 may be implemented by a UE or a network entity or its components as described herein. For example, the operations of the method 1200 may be performed by a UE 115 or a network entity 105 as described with reference to FIGS. 1-11. In some implementations, a UE or a network entity may execute a set of instructions to control the functional elements of the UE or the network entity to perform the described functions. Additionally, or alternatively, the UE or the network entity may perform aspects of the described functions using special-purpose hardware.

At 1205, the method may include transmitting, through a lens via a transmitting element of the device, first signaling, the lens including a first surface associated with a first curvature. The operations of 1205 may be performed in accordance with examples as disclosed herein. In some implementations, aspects of the operations of 1205 may be performed by a communications manager 1020 or a communications manager 1120 as described with reference to FIG. 10 or 11, respectively.

At 1210, the method may include receiving, through the lens via a receiving element of the device, second signaling, where the first curvature of the first surface enables simultaneous transmission by the transmitting element in a first direction of incident signaling at the lens and reception by the receiving element at a second direction of refracted signaling from the lens to the receiving element. The operations of 1210 may be performed in accordance with examples as disclosed herein. In some implementations, aspects of the operations of 1210 may be performed by a communications manager 1020 or a communications manager 1120 as described with reference to FIG. 10 or 11, respectively.

The following provides an overview of some aspects of the present disclosure:

Aspect 1: An apparatus, including: a lens that includes a first surface associated with a first curvature; a transmitting element operable to transmit through the lens; and a receiving element operable to receive through the lens, where the first curvature enables simultaneous transmission by the transmitting element in a first direction of incident signaling at the lens and reception by the receiving element at a second direction of refracted signaling from the lens to the receiving element.

Aspect 2: The apparatus of aspect 1, where the lens further includes an anti-reflective coating, and a thickness of the anti-reflective coating is associated with an angle of a transmission beam from the transmitting element that corresponds to a reflection, off the lens in accordance with the first curvature, toward the receiving element.

Aspect 3: The apparatus of aspect 2, where the first curvature is configured to dissipate the reflection off the lens toward the receiving element and focus signaling associated with the transmission beam into the lens.

Aspect 4: The apparatus of any of aspects 2 or 3, where the thickness of the anti-reflective coating is further associated with a set of one or more wavelengths used for the transmission by the transmitting element or the reception by the receiving element.

Aspect 5: The apparatus of any of aspects 1-4, where the lens further includes multiple anti-reflective coatings at different thicknesses and different anti-reflective coatings of the multiple anti-reflective coatings are associated with different sets of one or more wavelengths used for the transmission by the transmitting element or the reception by the receiving element.

Aspect 6: The apparatus of any of aspects 1-5, where the lens further includes a second surface associated with a second curvature and the first direction of incident signaling at the lens and the second direction of refracted signaling from the lens are associated with a first radius of the first surface and a second radius of the second surface, and first signaling transmitted from the transmitting element is directed away from second signaling received by the receiving element in accordance with the first direction of incident signaling at the lens and the second direction of refracted signaling from the lens, and the second signaling received at the receiving element is directed away from the first signaling transmitted from the transmitting element in accordance with the first direction of incident signaling at the lens and the second direction of refracted signaling from the lens.

Aspect 7: The apparatus of aspect 6, where the first radius of the first surface is smaller than the second radius of the second surface.

Aspect 8: The apparatus of any of aspects 6 or 7, where signaling from the transmitting element passes through the first surface of the lens prior to the second surface of the lens.

Aspect 9: The apparatus of any of aspects 1-8, where the transmission by the transmitting element and the reception by the receiving element at least partially overlap in frequency.

Aspect 10: The apparatus of any of aspects 1-9, where the lens is a plano-convex lens or a positive meniscus lens.

Aspect 11: A method for wireless communication at a device, including: transmitting, through a lens via a transmitting element of the device, first signaling, the lens including a first surface associated with a first curvature; and receiving, through the lens via a receiving element of the device, second signaling, where the first curvature of the first surface enables simultaneous transmission by the transmitting element in a first direction of incident signaling at the lens and reception by the receiving element at a second direction of refracted signaling from the lens to the receiving element.

Aspect 12: The method of aspect 11, where the lens further includes an anti-reflective coating, and a thickness of the anti-reflective coating is associated with an angle of a transmission beam from the transmitting element that corresponds to a reflection, off the lens in accordance with the first curvature, toward the receiving element.

Aspect 13: The method of aspect 12, where the first curvature is configured to dissipate the reflection off the lens toward the receiving element and focus signaling associated with the transmission beam into the lens.

Aspect 14: The method of any of aspects 12 or 13, where the thickness of the anti-reflective coating is further associated with a set of one or more wavelengths used for the transmission by the transmitting element or the reception by the receiving element.

Aspect 15: The method of any of aspects 11-14, where the lens further includes multiple anti-reflective coatings at different thicknesses and different anti-reflective coatings of the multiple anti-reflective coatings are associated with different sets of one or more wavelengths used for the transmission by the transmitting element or the reception by the receiving element.

Aspect 16: The method of any of aspects 11-15, where the lens further includes a second surface associated with a second curvature and the first direction of incident signaling at the lens and the second direction of refracted signaling from the lens are associated with a first radius of the first surface and a second radius of the second surface, and the first signaling transmitted from the transmitting element is directed away from the second signaling received by the receiving element in accordance with the first direction of incident signaling at the lens and the second direction of refracted signaling from the lens, and the second signaling received at the receiving element is directed away from the first signaling transmitted from the transmitting element in accordance with the first direction of incident signaling at the lens and the second direction of refracted signaling from the lens.

Aspect 17: The method of aspect 16, where the first radius of the first curvature is smaller than the second radius of the second curvature.

Aspect 18: The method of any of aspects 16 or 17, where signaling from the transmitting element passes through the first surface of the lens prior to the second surface of the lens.

Aspect 19: The method of any of aspects 11-18, where the transmission by the transmitting element and the reception by the receiving element at least partially overlap in frequency.

Aspect 20: The method of any of aspects 11-19, where the lens is a plano-convex lens or a positive meniscus lens.

Aspect 21: An apparatus for wireless communication at a device, including: an interface configured to: output, through a lens via a transmitting element of the device, first signaling, the lens including a first surface associated with a first curvature; and obtain, through the lens via a receiving element of the device, second signaling, where the first curvature of the first surface enables simultaneous transmission by the transmitting element in a first direction of incident signaling at the lens and reception by the receiving element at a second direction of refracted signaling from the lens to the receiving element.

Aspect 22: The apparatus of aspect 21, where: the lens further includes an anti-reflective coating; and a thickness of the anti-reflective coating is associated with an angle of a transmission beam from the transmitting element that corresponds to a reflection, off the lens in accordance with the first curvature, toward the receiving element.

Aspect 23: The apparatus of aspect 22, where the first curvature is configured to dissipate the reflection off the lens toward the receiving element and focus signaling associated with the transmission beam into the lens.

Aspect 24: The apparatus of any of aspects 22 or 23, where the thickness of the anti-reflective coating is further associated with a set of one or more wavelengths used for the transmission by the transmitting element or the reception by the receiving element.

Aspect 25: The apparatus of any of aspects 21-24, where the lens further includes multiple anti-reflective coatings at different thicknesses and different anti-reflective coatings of the multiple anti-reflective coatings are associated with different sets of one or more wavelengths used for the transmission by the transmitting element or the reception by the receiving element.

Aspect 26: The apparatus of any of aspects 21-25, where the lens further includes a second surface associated with a second curvature and the first direction of incident signaling at the lens and the second direction of refracted signaling from the lens are associated with a first radius of the first surface and a second radius of the second surface, and where: the first signaling output from the transmitting element is directed away from the second signaling obtained by the receiving element in accordance with the first direction of incident signaling at the lens and the second direction of refracted signaling from the lens; and the second signaling obtained at the receiving element is directed away from the first signaling output from the transmitting element in accordance with the first direction of incident signaling at the lens and the second direction of refracted signaling from the lens.

Aspect 27: The apparatus of aspect 26, where the first radius of the first curvature is smaller than the second radius of the second curvature.

Aspect 28: The apparatus of any of aspects 26 or 27, where signaling from the transmitting element passes through the first surface of the lens prior to the second surface of the lens.

Aspect 29: The apparatus of any of aspects 21-28, where the transmission by the transmitting element and the reception by the receiving element at least partially overlap in frequency.

Aspect 30: The apparatus of any of aspects 21-29, where the lens is a plano-convex lens or a positive meniscus lens.

Aspect 31: An apparatus for wireless communication at a device, including: a processor; memory coupled with the processor; and instructions stored in the memory and executable by the processor to cause the apparatus to: transmit, through a lens via a transmitting element of the device, first signaling, the lens including a first surface associated with a first curvature; and receive, through the lens via a receiving element of the device, second signaling, where the first curvature of the first surface enables simultaneous transmission by the transmitting element in a first direction of incident signaling at the lens and reception by the receiving element at a second direction of refracted signaling from the lens to the receiving element.

Aspect 32: The apparatus of aspect 31, where the lens further includes an anti-reflective coating, and a thickness of the anti-reflective coating is associated with an angle of a transmission beam from the transmitting element that corresponds to a reflection, off the lens in accordance with the first curvature, toward the receiving element.

Aspect 33: The apparatus of aspect 32, where the first curvature is configured to dissipate the reflection off the lens toward the receiving element and focus signaling associated with the transmission beam into the lens.

Aspect 34: The apparatus of any of aspects 32 or 33, where the thickness of the anti-reflective coating is further associated with a set of one or more wavelengths used for the transmission by the transmitting element or the reception by the receiving element.

Aspect 35: The apparatus of any of aspects 31-34, where the lens further includes multiple anti-reflective coatings at different thicknesses and different anti-reflective coatings of the multiple anti-reflective coatings are associated with different sets of one or more wavelengths used for the transmission by the transmitting element or the reception by the receiving element.

Aspect 36: The apparatus of any of aspects 31-35, where the lens further includes a second surface associated with a second curvature and the first direction of incident signaling at the lens and the second direction of refracted signaling from the lens are associated with a first radius of the first surface and a second radius of the second surface, and the first signaling transmitted from the transmitting element is directed away from the second signaling received by the receiving element in accordance with the first direction of incident signaling at the lens and the second direction of refracted signaling from the lens, and the second signaling received at the receiving element is directed away from the first signaling transmitted from the transmitting element in accordance with the first direction of incident signaling at the lens and the second direction of refracted signaling from the lens.

Aspect 37: The apparatus of aspect 36, where the first radius of the first curvature is smaller than the second radius of the second curvature.

Aspect 38: The apparatus of any of aspects 36 or 37, where signaling from the transmitting element passes through the first surface of the lens prior to the second surface of the lens.

Aspect 39: The apparatus of any of aspects 31-38, where the transmission by the transmitting element and the reception by the receiving element at least partially overlap in frequency.

Aspect 40: The apparatus of any of aspects 31-39, where the lens is a plano-convex lens or a positive meniscus lens.

Aspect 41: An apparatus for wireless communication at a device, including: means for transmitting, through a lens via a transmitting element of the device, first signaling, the lens including a first surface associated with a first curvature; and means for receiving, through the lens via a receiving element of the device, second signaling, where the first curvature of the first surface enables simultaneous transmission by the transmitting element in a first direction of incident signaling at the lens and reception by the receiving element at a second direction of refracted signaling from the lens to the receiving element.

Aspect 42: The apparatus of aspect 41, where the lens further includes an anti-reflective coating, and a thickness of the anti-reflective coating is associated with an angle of a transmission beam from the transmitting element that corresponds to a reflection, off the lens in accordance with the first curvature, toward the receiving element.

Aspect 43: The apparatus of aspect 42, where the first curvature is configured to dissipate the reflection off the lens toward the receiving element and focus signaling associated with the transmission beam into the lens.

Aspect 44: The apparatus of any of aspects 42 or 43, where the thickness of the anti-reflective coating is further associated with a set of one or more wavelengths used for the transmission by the transmitting element or the reception by the receiving element.

Aspect 45: The apparatus of any of aspects 41-44, where the lens further includes multiple anti-reflective coatings at different thicknesses and different anti-reflective coatings of the multiple anti-reflective coatings are associated with different sets of one or more wavelengths used for the transmission by the transmitting element or the reception by the receiving element.

Aspect 46: The apparatus of any of aspects 41-45, where the lens further includes a second surface associated with a second curvature and the first direction of incident signaling at the lens and the second direction of refracted signaling from the lens are associated with a first radius of the first surface and a second radius of the second surface, and the first signaling transmitted from the transmitting element is directed away from the second signaling received by the receiving element in accordance with the first direction of incident signaling at the lens and the second direction of refracted signaling from the lens, and the second signaling received at the receiving element is directed away from the first signaling transmitted from the transmitting element in accordance with the first direction of incident signaling at the lens and the second direction of refracted signaling from the lens.

Aspect 47: The apparatus of aspect 46, where the first radius of the first curvature is smaller than the second radius of the second curvature.

Aspect 48: The apparatus of any of aspects 46 or 47, where signaling from the transmitting element passes through the first surface of the lens prior to the second surface of the lens.

Aspect 49: The apparatus of any of aspects 41-48, where the transmission by the transmitting element and the reception by the receiving element at least partially overlap in frequency.

Aspect 50: The apparatus of any of aspects 41-49, where the lens is a plano-convex lens or a positive meniscus lens.

Aspect 51: A non-transitory computer-readable medium storing code for wireless communication at a device, the code including instructions executable by a processor to: transmit, through a lens via a transmitting element of the device, first signaling, the lens including a first surface associated with a first curvature; and receive, through the lens via a receiving element of the device, second signaling, where the first curvature of the first surface enables simultaneous transmission by the transmitting element in a first direction of incident signaling at the lens and reception by the receiving element at a second direction of refracted signaling from the lens to the receiving element.

Aspect 52: The non-transitory computer-readable medium of aspect 51, where the lens further includes an anti-reflective coating, and a thickness of the anti-reflective coating is associated with an angle of a transmission beam from the transmitting element that corresponds to a reflection, off the lens in accordance with the first curvature, toward the receiving element.

Aspect 53: The non-transitory computer-readable medium of aspect 52, where the first curvature is configured to dissipate the reflection off the lens toward the receiving element and focus signaling associated with the transmission beam into the lens.

Aspect 54: The non-transitory computer-readable medium of any of aspects 52 or 53, where the thickness of the anti-reflective coating is further associated with a set of one or more wavelengths used for the transmission by the transmitting element or the reception by the receiving element.

Aspect 55: The non-transitory computer-readable medium of any of aspects 51-54, where the lens further includes multiple anti-reflective coatings at different thicknesses and different anti-reflective coatings of the multiple anti-reflective coatings are associated with different sets of one or more wavelengths used for the transmission by the transmitting element or the reception by the receiving element.

Aspect 56: The non-transitory computer-readable medium of any of aspects 51-55, where the lens further includes a second surface associated with a second curvature and the first direction of incident signaling at the lens and the second direction of refracted signaling from the lens are associated with a first radius of the first surface and a second radius of the second surface, and the first signaling transmitted from the transmitting element is directed away from the second signaling received by the receiving element in accordance with the first direction of incident signaling at the lens and the second direction of refracted signaling from the lens, and the second signaling received at the receiving element is directed away from the first signaling transmitted from the transmitting element in accordance with the first direction of incident signaling at the lens and the second direction of refracted signaling from the lens.

Aspect 57: The non-transitory computer-readable medium of aspect 56, where the first radius of the first curvature is smaller than the second radius of the second curvature.

Aspect 58: The non-transitory computer-readable medium of any of aspects 56 or 57, where signaling from the transmitting element passes through the first surface of the lens prior to the second surface of the lens.

Aspect 59: The non-transitory computer-readable medium of any of aspects 51-58, where the transmission by the transmitting element and the reception by the receiving element at least partially overlap in frequency.

Aspect 60: The non-transitory computer-readable medium of any of aspects 51-59, where the lens is a plano-convex lens or a positive meniscus lens.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data in a memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus, comprising:
   a lens that includes a first surface associated with a first curvature;
   a transmitting element operable to transmit through the lens; and
   a receiving element operable to receive through the lens, wherein the first curvature enables simultaneous transmission by the transmitting element in a first direction of incident signaling at the lens and reception by the receiving element at a second direction of refracted signaling from the lens to the receiving element in accordance with the first curvature being configured to disperse a reflection off the lens away from the receiving element or configured to direct the reflection off the lens away from the receiving element.

2. The apparatus of claim 1, wherein:
   the lens further includes an anti-reflective coating; and
   a thickness of the anti-reflective coating is associated with an angle of a transmission beam from the transmitting element that corresponds to a reflection, off the lens in accordance with the first curvature, toward the receiving element.

3. The apparatus of claim 2, wherein the first curvature is configured to dissipate the reflection off the lens toward the receiving element and focus signaling associated with the transmission beam into the lens.

4. The apparatus of claim 2, wherein the thickness of the anti-reflective coating is further associated with a set of one or more wavelengths used for the transmission by the transmitting element or the reception by the receiving element.

5. The apparatus of claim 1, wherein the lens further includes multiple anti-reflective coatings at different thicknesses and different anti-reflective coatings of the multiple anti-reflective coatings are associated with different sets of one or more wavelengths used for the transmission by the transmitting element or the reception by the receiving element.

6. The apparatus of claim 1, wherein the lens further includes a second surface associated with a second curvature and the first direction of incident signaling at the lens and the second direction of refracted signaling from the lens are associated with a first radius of the first surface and a second radius of the second surface, and wherein:
   first signaling transmitted from the transmitting element is directed away from second signaling received by the receiving element in accordance with the first direction of incident signaling at the lens and the second direction of refracted signaling from the lens; and
   the second signaling received at the receiving element is directed away from the first signaling transmitted from the transmitting element in accordance with the first direction of incident signaling at the lens and the second direction of refracted signaling from the lens.

7. The apparatus of claim 6, wherein the first radius of the first surface is smaller than the second radius of the second surface.

8. The apparatus of claim 6, wherein signaling from the transmitting element passes through the first surface of the lens prior to the second surface of the lens.

9. The apparatus of claim 1, wherein the transmission by the transmitting element and the reception by the receiving element at least partially overlap in frequency.

10. The apparatus of claim 1, wherein the lens is a plano-convex lens or a positive meniscus lens.

11. An apparatus for wireless communication at a device, comprising:
    an interface configured to:
      output, through a lens via a transmitting element of the device, first signaling, the lens comprising a first surface associated with a first curvature; and
      obtain, through the lens via a receiving element of the device, second signaling, wherein the first curvature of the first surface enables simultaneous transmission by the transmitting element in a first direction of incident signaling at the lens and reception by the receiving element at a second direction of refracted signaling from the lens to the receiving element in accordance with the first curvature being configured to disperse a reflection off the lens away from the receiving element or configured to direct the reflection off the lens away from the receiving element.

12. The apparatus of claim 11, wherein:
    the lens further includes an anti-reflective coating; and
    a thickness of the anti-reflective coating is associated with an angle of a transmission beam from the transmitting element that corresponds to a reflection, off the lens in accordance with the first curvature, toward the receiving element.

13. The apparatus of claim 12, wherein the first curvature is configured to dissipate the reflection off the lens toward the receiving element and focus signaling associated with the transmission beam into the lens.

14. The apparatus of claim 12, wherein the thickness of the anti-reflective coating is further associated with a set of one or more wavelengths used for the transmission by the transmitting element or the reception by the receiving element.

15. The apparatus of claim 11, wherein the lens further includes multiple anti-reflective coatings at different thicknesses and different anti-reflective coatings of the multiple anti-reflective coatings are associated with different sets of one or more wavelengths used for the transmission by the transmitting element or the reception by the receiving element.

16. The apparatus of claim 11, wherein the lens further includes a second surface associated with a second curvature and the first direction of incident signaling at the lens and the second direction of refracted signaling from the lens are associated with a first radius of the first surface and a second radius of the second surface, and wherein:
the first signaling output from the transmitting element is directed away from the second signaling obtained by the receiving element in accordance with the first direction of incident signaling at the lens and the second direction of refracted signaling from the lens; and
the second signaling obtained at the receiving element is directed away from the first signaling output from the transmitting element in accordance with the first direction of incident signaling at the lens and the second direction of refracted signaling from the lens.

17. The apparatus of claim 16, wherein the first radius of the first curvature is smaller than the second radius of the second curvature.

18. The apparatus of claim 16, wherein signaling from the transmitting element passes through the first surface of the lens prior to the second surface of the lens.

19. The apparatus of claim 11, wherein the transmission by the transmitting element and the reception by the receiving element at least partially overlap in frequency.

20. The apparatus of claim 11, wherein the lens is a plano-convex lens or a positive meniscus lens.

21. A method for wireless communication at a device, comprising:
transmitting, through a lens via a transmitting element of the device, first signaling, the lens comprising a first surface associated with a first curvature; and
receiving, through the lens via a receiving element of the device, second signaling, wherein the first curvature of the first surface enables simultaneous transmission by the transmitting element in a first direction of incident signaling at the lens and reception by the receiving element at a second direction of refracted signaling from the lens to the receiving element in accordance with the first curvature being configured to disperse a reflection off the lens away from the receiving element or configured to direct the reflection off the lens away from the receiving element.

22. The method of claim 21, wherein:
the lens further includes an anti-reflective coating; and
a thickness of the anti-reflective coating is associated with an angle of a transmission beam from the transmitting element that corresponds to a reflection, off the lens in accordance with the first curvature, toward the receiving element.

23. The method of claim 22, wherein the first curvature is configured to dissipate the reflection off the lens toward the receiving element and focus signaling associated with the transmission beam into the lens.

24. The method of claim 22, wherein the thickness of the anti-reflective coating is further associated with a set of one or more wavelengths used for the transmission by the transmitting element or the reception by the receiving element.

25. The method of claim 21, wherein the lens further includes multiple anti-reflective coatings at different thicknesses and different anti-reflective coatings of the multiple anti-reflective coatings are associated with different sets of one or more wavelengths used for the transmission by the transmitting element or the reception by the receiving element.

26. The method of claim 21, wherein the lens further includes a second surface associated with a second curvature and the first direction of incident signaling at the lens and the second direction of refracted signaling from the lens are associated with a first radius of the first surface and a second radius of the second surface, and wherein:
the first signaling transmitted from the transmitting element is directed away from the second signaling received by the receiving element in accordance with the first direction of incident signaling at the lens and the second direction of refracted signaling from the lens; and
the second signaling received at the receiving element is directed away from the first signaling transmitted from the transmitting element in accordance with the first direction of incident signaling at the lens and the second direction of refracted signaling from the lens.

27. An apparatus for wireless communication at a device, comprising:
means for transmitting, through a lens via a transmitting element of the device, first signaling, the lens comprising a first surface associated with a first curvature; and
means for receiving, through the lens via a receiving element of the device, second signaling, wherein the first curvature of the first surface enables simultaneous transmission by the transmitting element in a first direction of incident signaling at the lens and reception by the receiving element at a second direction of refracted signaling from the lens to the receiving element in accordance with the first curvature being configured to disperse a reflection off the lens away from the receiving element or configured to direct the reflection off the lens away from the receiving element.

28. The apparatus of claim 27, wherein:
the lens further includes an anti-reflective coating, and
a thickness of the anti-reflective coating is associated with an angle of a transmission beam from the transmitting element that corresponds to a reflection, off the lens in accordance with the first curvature, toward the receiving element.

29. The apparatus of claim 28, wherein the first curvature is configured to dissipate the reflection off the lens toward the receiving element and focus signaling associated with the transmission beam into the lens.

30. The apparatus of claim 28, wherein the thickness of the anti-reflective coating is further associated with a set of one or more wavelengths used for the transmission by the transmitting element or the reception by the receiving element.

* * * * *